US008978879B2

(12) United States Patent
Fourney

(10) Patent No.: US 8,978,879 B2
(45) Date of Patent: Mar. 17, 2015

(54) MULTI-DIRECTIONAL ROLLER ASSEMBLY

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/754,077

(22) Filed: Jan. 30, 2013

(65) Prior Publication Data

US 2013/0192954 A1     Aug. 1, 2013

Related U.S. Application Data

(60) Provisional application No. 61/592,708, filed on Jan. 31, 2012.

(51) Int. Cl.
| | |
|---|---|
| *B65G 13/02* | (2006.01) |
| *B65G 39/04* | (2006.01) |
| *B65G 13/04* | (2006.01) |
| *B65G 39/12* | (2006.01) |
| *B65G 39/00* | (2006.01) |

(Continued)

(52) U.S. Cl.
CPC ............... *B65G 39/04* (2013.01); *B65G 13/04* (2013.01); *B65G 39/12* (2013.01); *B65G 39/00* (2013.01); *B65G 47/22* (2013.01); *B65G 47/244* (2013.01); *B65G 47/71* (2013.01); *B65G 13/10* (2013.01); *B65G 13/07* (2013.01); *B65G 2207/34* (2013.01)
USPC .. 198/782; 198/370.09; 198/786; 193/35 MD

(58) Field of Classification Search
CPC ........ B65G 13/10; B65G 39/00; B65G 47/54; B65G 2207/34

USPC .......................... 198/370.09, 371.3, 782, 786; 193/35 MD
See application file for complete search history.

(56) References Cited

U.S. PATENT DOCUMENTS

| | | | | |
|---|---|---|---|---|
| 3,100,039 | A | * | 8/1963 | Oderman et al. ............. 198/414 |
| 3,174,613 | A | * | 3/1965 | Insolio ....................... 198/369.4 |

(Continued)

FOREIGN PATENT DOCUMENTS

| | | |
|---|---|---|
| DE | 3910524 A1 | 3/1990 |
| FR | 2852940 A1 | 10/2004 |

(Continued)

OTHER PUBLICATIONS

International Search Report and Written Opinion of the International Searching Authority, PCT/US2013/023997, mailed May 14, 2013, Korean Intellectual Property Office, Daejeon Metropolitan City, Republic of Korea.

*Primary Examiner* — Leslie A Nicholson, III
*Assistant Examiner* — Keith R Campbell
(74) *Attorney, Agent, or Firm* — Catherine M. Bishop

(57) ABSTRACT

A multi-directional roller assembly for directing articles in a conveying system. The multi-directional roller assembly has a rotatable roller frame housing at least one set of mutually-actuating rollers. The multi-directional roller assembly directs an article supported by the assembly along a trajectory determined by the orientation of the multi-directional roller assembly relative to an input force. The orientation of the multi-directional roller assembly may be changed to change the trajectory. A conveyor system may include an array of multi-directional roller assemblies. An actuator controls the orientation of the multi-directional roller assemblies individually and may also control an array of multi-directional roller assemblies as a group.

34 Claims, 29 Drawing Sheets

(51) Int. Cl.
  *B65G 47/22* (2006.01)
  *B65G 47/244* (2006.01)
  *B65G 47/71* (2006.01)
  *B65G 13/10* (2006.01)
  *B65G 13/07* (2006.01)

(56) References Cited

U.S. PATENT DOCUMENTS

| | | | |
|---|---|---|---|
| 3,978,975 A * | 9/1976 | Herbes et al. | 198/782 |
| 4,399,675 A * | 8/1983 | Erdmann et al. | 72/37 |
| 4,589,542 A * | 5/1986 | Steadman | 198/782 |
| 4,981,203 A | 1/1991 | Kornylak | |
| 6,073,747 A * | 6/2000 | Takino et al. | 198/370.09 |
| 6,244,417 B1 | 6/2001 | Timmer et al. | |
| 6,315,109 B1 * | 11/2001 | Dean | 198/786 |
| 6,494,312 B2 | 12/2002 | Costanzo | |
| 6,889,815 B2 * | 5/2005 | Kanamori et al. | 198/369.4 |
| 6,968,941 B2 | 11/2005 | Fourney | |
| 7,040,478 B2 * | 5/2006 | Ehlert | 198/370.09 |
| 7,506,751 B2 | 3/2009 | Fourney | |
| 7,588,137 B2 | 9/2009 | Fourney | |
| 8,474,596 B2 * | 7/2013 | Wolkerstorfer et al. | 198/370.09 |
| 8,567,587 B2 * | 10/2013 | Faist et al. | 198/370.09 |
| 8,752,696 B2 * | 6/2014 | Reidhaar | 198/780 |
| 2006/0086590 A1 * | 4/2006 | Bonham et al. | 198/370.09 |
| 2011/0022221 A1 * | 1/2011 | Fourney | 700/230 |
| 2011/0303512 A1 | 12/2011 | Rau | |
| 2013/0037388 A1 | 2/2013 | Faist et al. | |

FOREIGN PATENT DOCUMENTS

| | | |
|---|---|---|
| JP | 8026471 A | 1/1996 |
| JP | 8113341 A | 5/1996 |
| JP | 9002636 A | 1/1997 |
| JP | 10206217 A | 8/1998 |

* cited by examiner

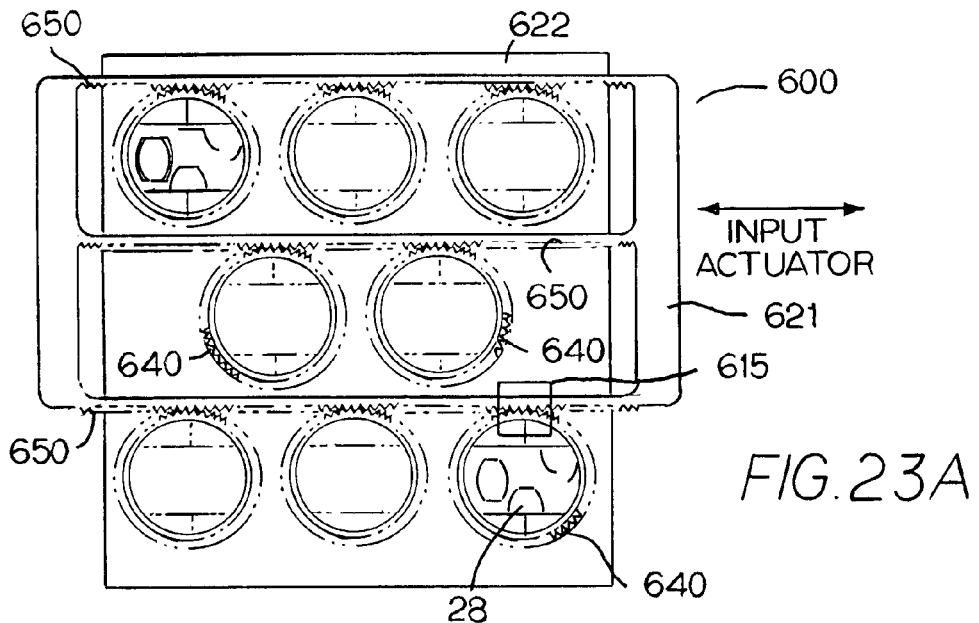
FIG.23A
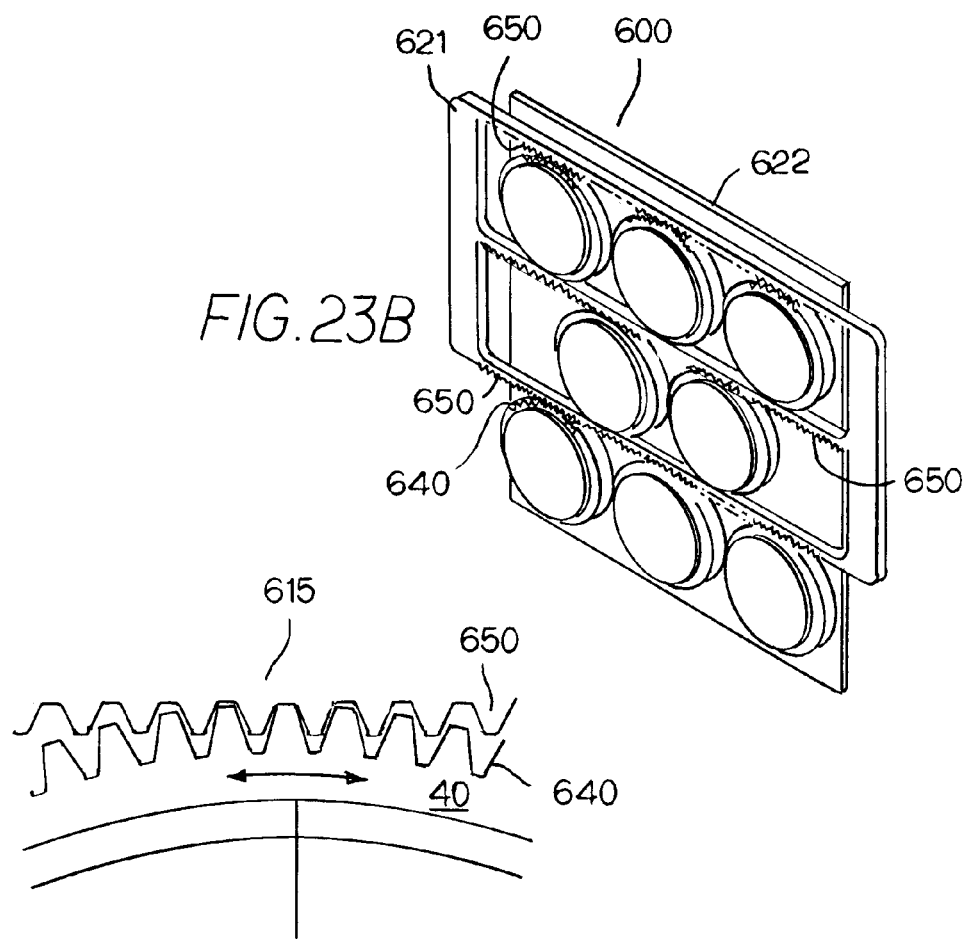
FIG.23B
FIG.24

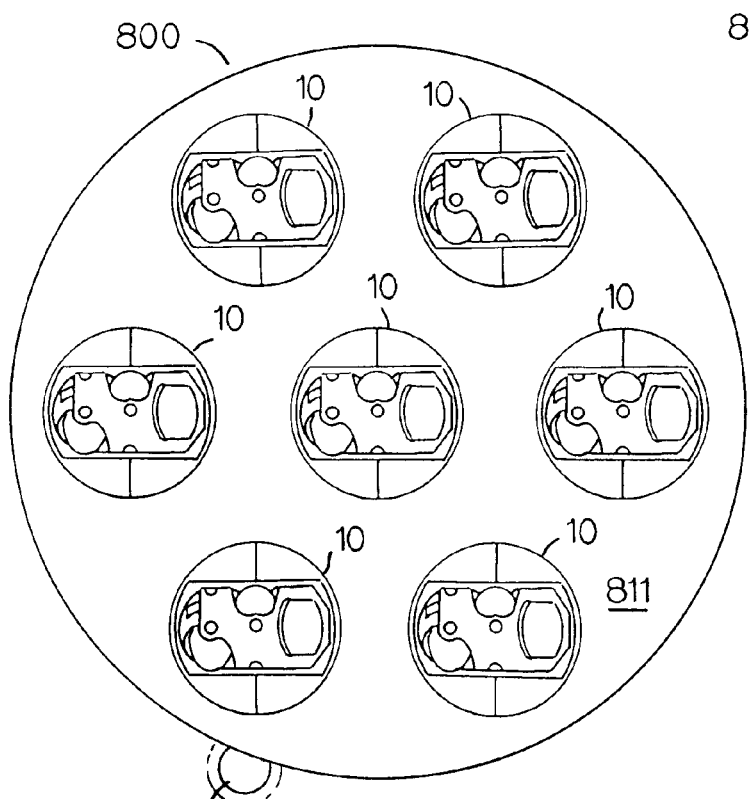
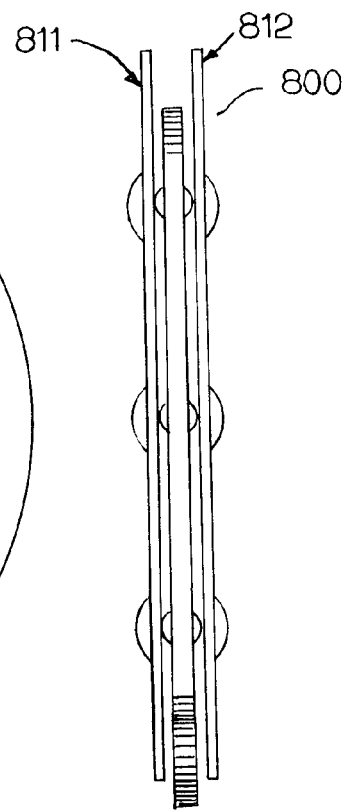
FIG. 27A  FIG. 27B
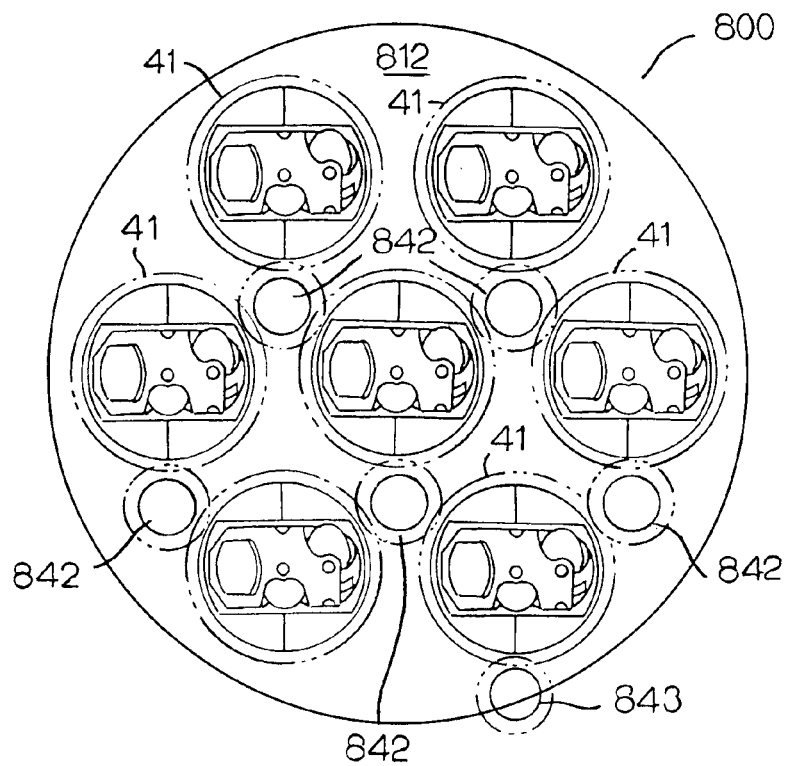
FIG. 27C

MULTI-DIRECTIONAL ROLLER ASSEMBLY

RELATED APPLICATIONS

The present invention claims priority to U.S. Provisional Patent Application Ser. No. 61/592,708, filed Jan. 31, 2012, the contents of which are herein incorporated by reference.

BACKGROUND

The invention relates generally to power-driven conveyors and more particularly to conveyors having actuated, multi-directional rollers for manipulating the trajectory of articles through a conveyor system.

Many package- and material-handling applications require that conveyed articles be diverted to a side of a conveyor. Two examples are sorting articles off the side of a belt and registering articles against the side of the belt. U.S. Pat. No. 6,494,312, "Modular Roller-Top Conveyor Belt with Obliquely-Arranged Rollers," Dec. 17, 2002, to Costanzo discloses a conveyor system in which cylindrical rollers mounted in a conveyor belt on axles oblique to the direction of belt travel are actuated by underlying bearing surfaces on which the oblique rollers ride as the belt advances in the direction of belt travel. The contact between the rollers and the bearing surfaces causes the rollers to rotate as the belt advances. The rotation of the oblique rollers pushes articles atop the rollers across the conveyor belt toward a side of the conveyor. These oblique-roller belts work extremely well on planar bearing surfaces as long as the rollers are arranged to rotate at an angle between the direction of belt travel (defined as a roller angle of 0° and about 30° or so from the direction of belt travel. For roller angles greater than 30°, the rollers slip too much on the planar bearing surfaces.

U.S. Pat. No. 6,968,941, "Apparatus and Methods for Conveying Objects," Nov. 29, 2005, to Fourney describes an improved bearing surface that accommodates a much greater range of roller angles. Instead of using a planar bearing surface, Fourney uses the outer peripheries of actuating rollers arranged to rotate on axes in the direction of belt travel. As the conveyor belt advances, the oblique belt rollers roll on the underlying actuating rollers, which are also caused to roll on their axes. Because the bearing surface on the periphery is rolling, slip is reduced and greater roller angles can be accommodated. The greater roller angles permit much sharper article-diversion trajectories than are possible with a planar bearing surface. But actuating rollers are more expensive and slightly more complicated than simple planar bearing surfaces.

U.S. Pat. No. 7,588,137, "Conveyor Belt Having Rollers that Displace Objects," Sep. 15, 2009, to Fourney describes a conveyor belt that includes multiple roller sets used to divert objects from the conveyor belt. The angles along which articles can be diverted from the conveyor are limited.

SUMMARY

An embodiment of the present invention provides a multi-directional roller assembly comprising a rotatable roller frame housing at least one set of mutually-actuating rollers. The multi-directional roller assembly directs an article supported by the assembly along a trajectory determined by the orientation of the multi-directional roller assembly relative to an input force. The orientation of the multi-directional roller assembly may be changed to change the trajectory. A conveyor system may include an array of multi-directional roller assemblies. An actuator controls the orientation of the multi-directional roller assemblies individually, and may also control an array of multi-directional roller assemblies as a group.

According to one aspect of the invention, a multi-directional roller assembly comprises a frame rotatable about a main axis and at least one set of mutually-actuating rollers mounted to the frame. Each roller is rotatable about a minor axis that is transverse to the main axis.

According to another aspect of the invention, a roller plate comprises an upper plate having an array of openings, a lower plate having an array of openings matching the array of openings in the upper plate, and an array of multi-directional roller assemblies housed in the openings. Each multi-directional roller assembly comprises a frame rotatable about a main axis and at least one set of rollers mounted to the frame, each roller rotatable about a minor axis that is transverse to the main axis.

According to another aspect of the invention, a conveyor system comprises an array of multi-directional roller assemblies, each multi-directional roller assembly comprising a frame rotatable about a main axis and at least one set of rollers mounted to the frame, each roller rotatable about a minor axis that is transverse to the main axis. A driver, which may be a conveyor belt, induces rotation of one of the frame and one set of rollers.

According to another aspect of the invention, a method of directing an article of conveyance using a multi-directional roller assembly is provided. The multi-directional roller assembly includes a frame rotatable about a main axis and at least one roller rotatable about a minor axis that is transverse to the main axis. The method comprises placing the article in contact with the multi-directional roller assembly and applying an input force to the multi-directional roller assembly at an input angle relative to the major axis, causing rotation of at least one of the frame and the roller, such that the article is pushed from the multi-directional roller assembly at an output angle that is at least twice the input angle.

BRIEF DESCRIPTION OF THE DRAWINGS

These aspects and features of the invention, as well as its advantages, are explained in more detail in the following description, appended claims, and accompanying drawings, in which:

FIGS. 23A and 23B are top and perspective views of a roller plate that employs gears to orient an array of multi-directional roller assemblies housed therein;

FIG. 24 is a detailed view of region 615 of FIG. 23A, showing an engagement between a gear rack and roller assembly housing in the roller plate of FIGS. 23A and 23B;

FIGS. 27A-27C are top, side and bottom views of a roller plate employing spur gears to orient an array of multi-directional roller assemblies housed therein;

DETAILED DESCRIPTION

A conveyor system includes an array of multi-directional roller assemblies. Each multi-directional roller assembly includes a rotatable frame and rollers for supporting articles of conveyance and for manipulating the trajectory of the articles through the conveyor system. In addition to an array of multi-directional roller assemblies, a conveyor system may include an actuator that may control the orientation of the multi-directional roller assemblies individually, as well as control an array of multi-directional roller assemblies as a group. The invention will be described below relative to certain illustrative embodiments.

Figure 1A:
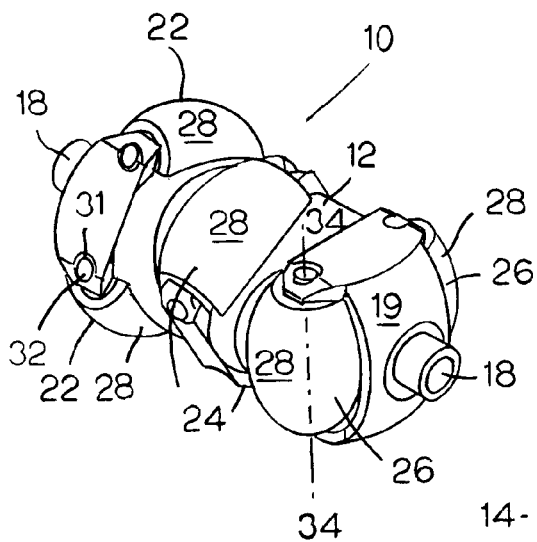
FIG. 1A is a perspective view of a multi-directional roller assembly according to an illustrative embodiment of the invention.
Figure 1B:
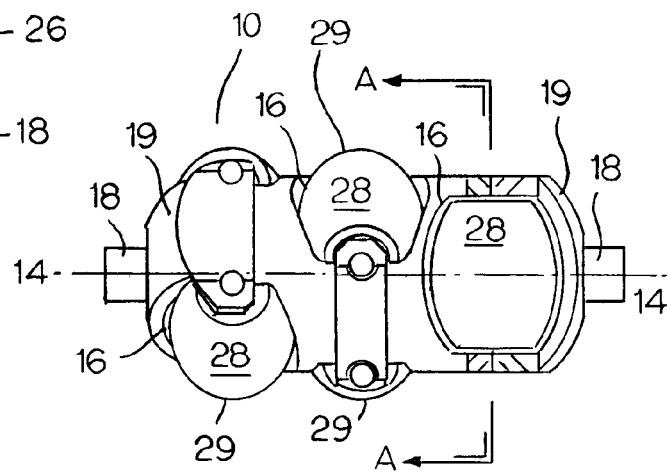
FIG. 1B is a side view of the multi-directional roller assembly of FIG. 1A.
Figure 1C:
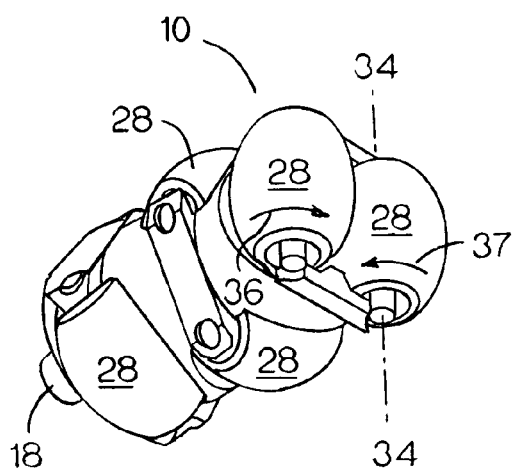
FIG. 1C illustrates the multi-directional roller assembly of FIGS. 1A and 1B without an end cover.

An embodiment of a multi-directional roller assembly suitable for use in a conveyor system is shown in FIGS. 1A-1C. The multi-directional roller assembly 10 includes a frame 12 rotatable about a main axis 14. The frame 12 includes axle nubs 18 extending along the main axis 14. The axle nubs 18 are formed in an end cover 19. The frame further includes openings 16 for receiving rollers 28. At least one set of mutually-actuating rollers is mounted to the frame 12 in the openings 16. The illustrative embodiment shows three sets 22, 24, 26 of mutually-actuating rollers disposed along the length of the frame 12 at different orientations, each set comprising a pair of parallel, substantially elliptical-shaped rollers 28. The illustrative frame 12 includes roller axle openings 31 for receiving roller axles 32 extending through the rollers along a minor axis 34. Each roller 28 is rotatable about a minor axis 34, defined by the axles 32. Each minor axis 34 is oriented transverse to the main axis of rotation 14. (As used in this description, transverse axes are axes that are not parallel to each other, which includes skew axes that lie in different planes.) As shown in FIG. 1B, the outside surfaces 29 of the rollers 28 extend beyond the frame 12 of the assembly. In one embodiment, each roller 28 is a flat-ended ellipsoid with axles extending through a central passageway, but the rollers may have any suitable shape and configuration. In another embodiment, the rollers 28 include axle nubs for rotatable mounting in the frame 12. Other suitable means for rotatably mounting the rollers to the frame may be used.

Figure 2:
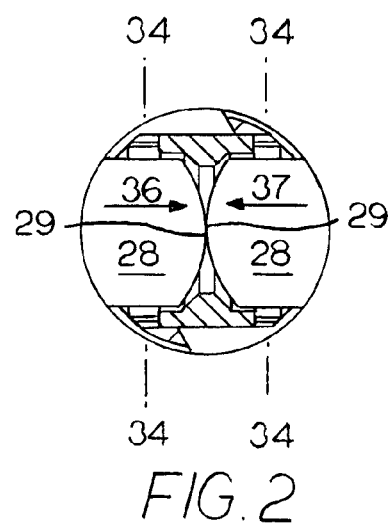
FIG. 2 is a cross-sectional view of a roller set of the multi-directional roller assembly of FIGS. 1A-1C along lines A-A.

The rollers 28 in each set may mutually-actuate each other through any suitable means. For example, as shown in FIG. 2, roller contact between the outside surfaces 29 of associated rollers 28 causes transfer of rotational force from one roller to the other. In this manner, when one roller is driven in a first direction, indicated by arrow 36 in FIG. 1C, the associated roller rolls in an opposite direction, indicated by arrow 37 in FIGS. 1C and 2. Alternatively, the rollers may mutually-actuate through gears, magnetic actuation, or another suitable means. For example, the surface of each roller may include teeth, with the teeth engaging each other to allow mutual-actuation. The material forming the outer surfaces of the rollers 28 may composed of a resilient or at least pliable material to reduce slip between the rollers. In another embodiment, external gears connected to the rollers may allow mutual-actuation of the rollers.

Figure 3A:
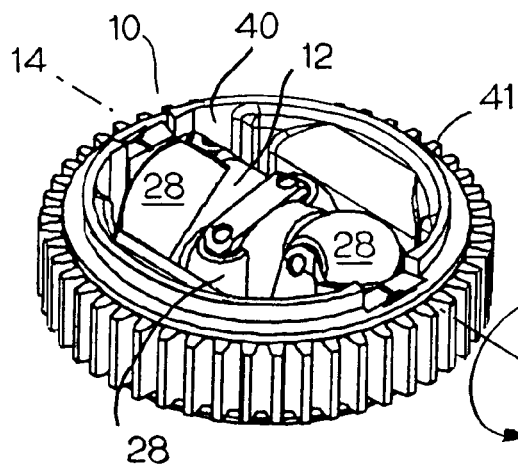
FIG. 3A is a perspective view of a multidirectional roller assembly including a roller housing.
Figure 3B:
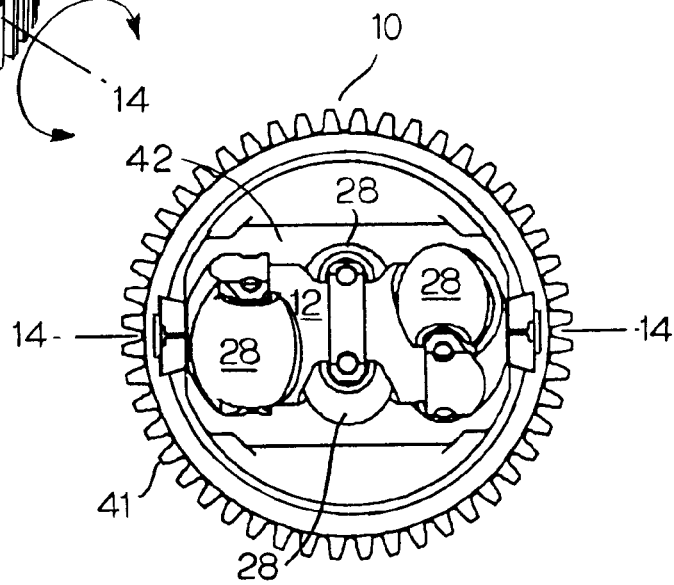
FIG. 3B is a top view of the multidirectional roller assembly of FIG. 3A.
Figure 3C:
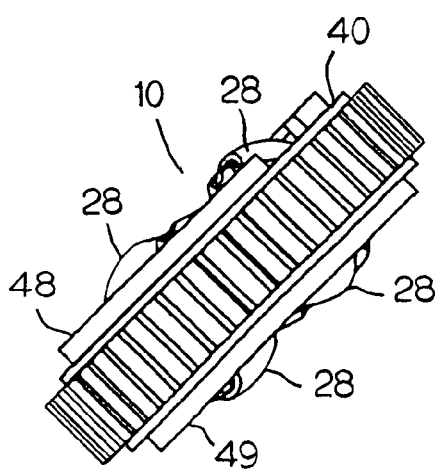
FIG. 3C is a side view of the multidirectional roller assembly of FIG. 3A.
Figure 3D:
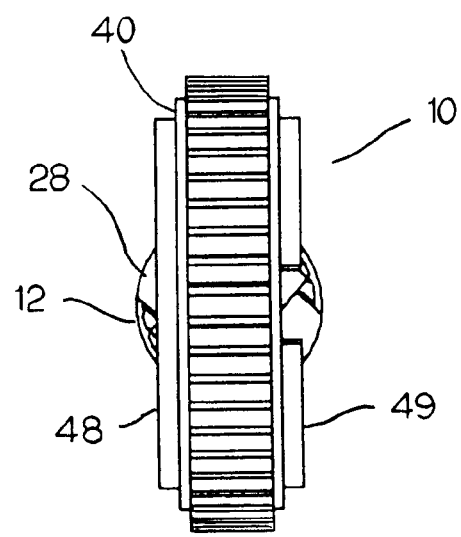
FIG. 3D is a front view of the multidirectional roller assembly of FIG. 3A.
Figure 4:
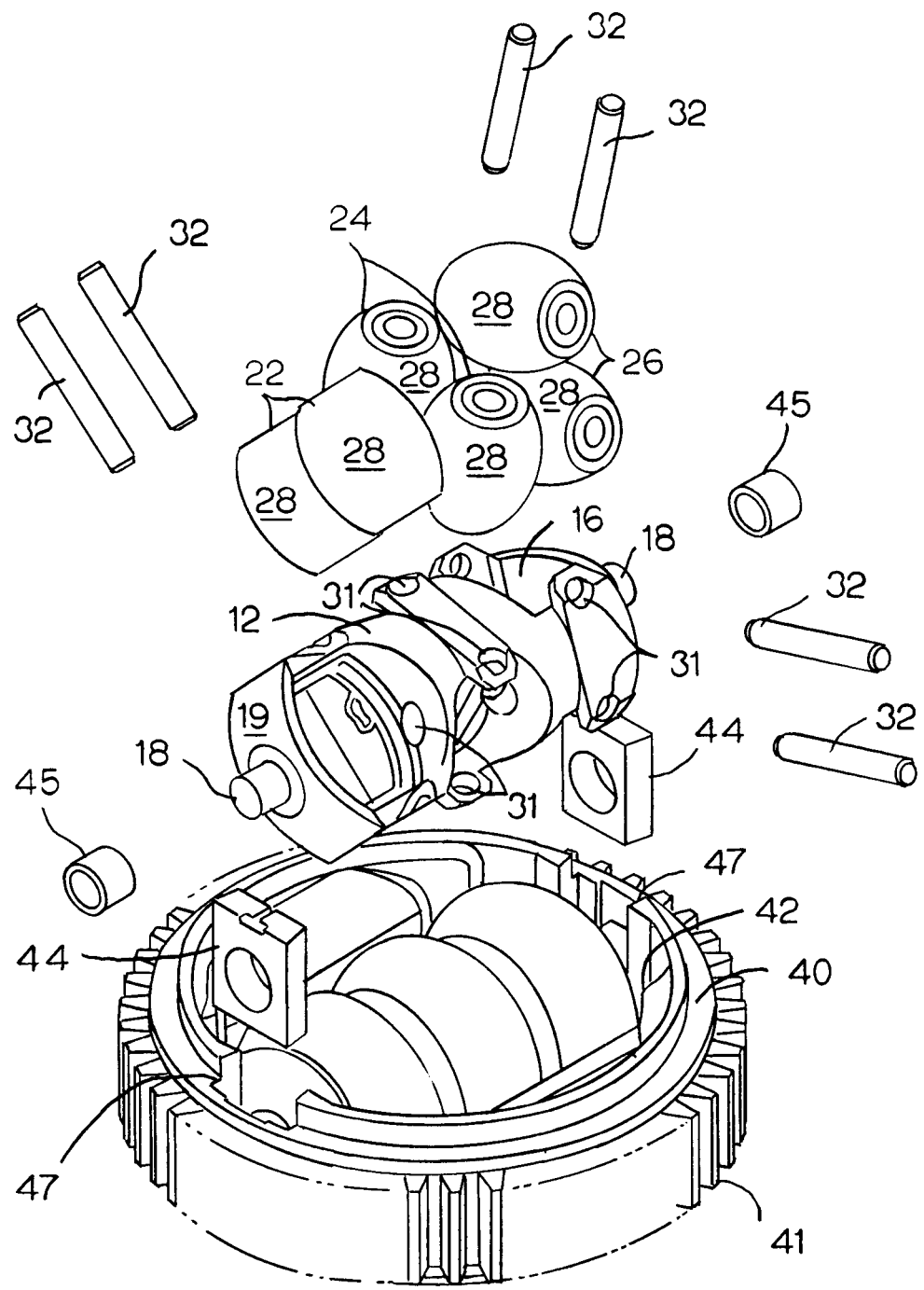
FIG. 4 is an exploded view of the multi-directional roller assembly of FIG. 3A.

As shown in FIGS. 3A-4, a multi-directional roller assembly 10 may further include a roller housing 40 for rotatably mounting the frame 12 and rollers 28. Preferably, the frame 12 spins freely about the major axis 14 within the housing 40. The illustrative housing 40 is a round, disk-shaped housing with a central opening 42 for receiving the frame 12. As shown in FIG. 4, the illustrative roller assembly includes bearings 45 and axle inserts 44 that are insertable in slots 47 in the housing. The bearings 45 and axle inserts 45 receive the axle nubs 18 of the frame 12 to rotatably mount the frame 12 to the housing 40. Salient portions of the frame 12 and rollers 28 protrude outside the top and bottom surfaces 48, 49 of the housing 40.

Each set of rollers 28 is oriented at a different angle relative to the frame 12. Preferably, the sets of rollers 28 are equally spaced around the frame periphery, with the summation of the angles between a series of consecutive minor axes of rotation 34 equal to 90°. In the version shown in FIGS. 1A-4, the frame 12 houses three sets of roller pairs offset by 45° relative to each other. In this manner, at least one set of rollers at all times extends beyond the top and bottom surfaces 48, 49 of the housing, regardless of the rotational orientation of the frame 12.

In the embodiment shown in FIGS. 3A-4, the housing 40 further includes teeth 41 about the perimeter or a portion of the perimeter. The teeth 41 engage gears or another device to orient the roller assembly, as described below.

Figure 5:
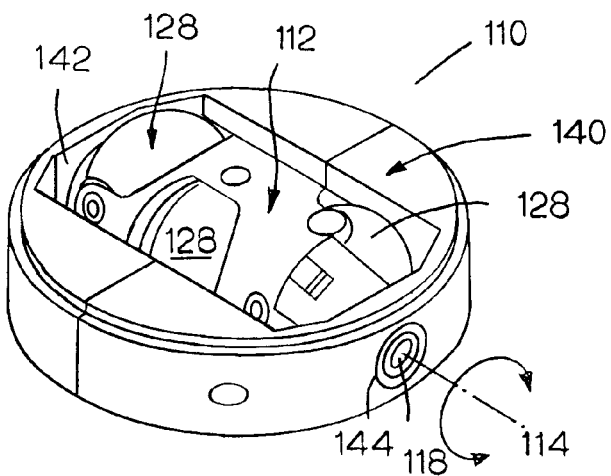
FIG. 5 is a perspective view of another embodiment of a multi-directional roller assembly.

FIG. 5 shows another embodiment of a multi-directional roller assembly 110. The roller assembly 110 include a disc-shaped housing 140 having an opening 142 for receiving a rotatable frame 112 housing mutually-actuating rollers 128. The frame 112 includes axle nubs 118 mounted in an opening 144 in the housing 140. The frame 112 rotates about an axis 114 within the housing 140. The frame 112 is more cylindrical than the frame 12 of FIGS. 1-4, but the principles of operation are substantially the same.

Figures 6A, 6B:
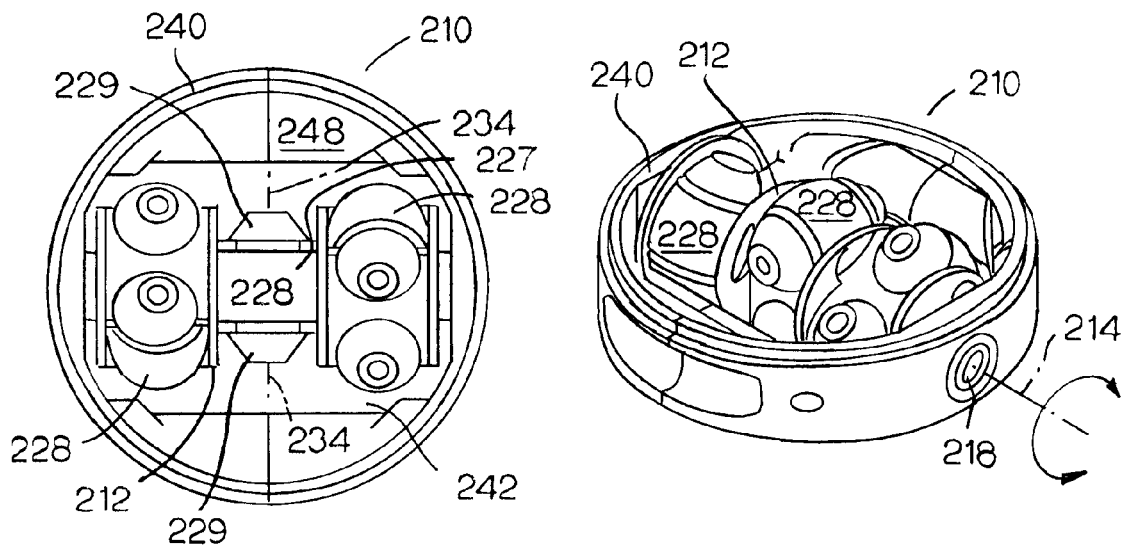
FIG. 6A is a top view of another embodiment of a multi-directional roller assembly.
FIG. 6B is a perspective view of the multi-directional roller assembly of FIG. 6A.
Figure 6C:
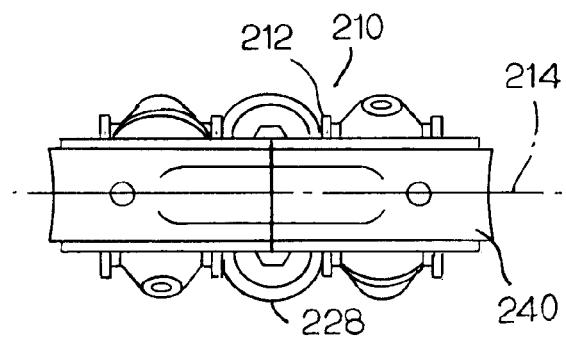
FIG. 6C is a side view of the multi-directional roller assembly of FIG. 6A.
Figure 6D:
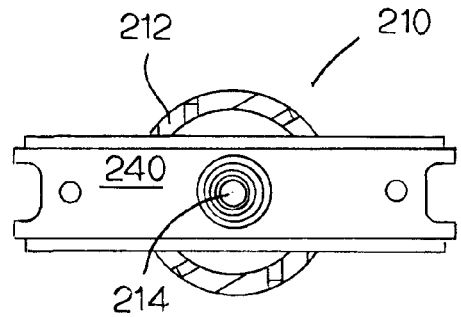
FIG. 6D is front view of the multi-directional roller assembly of FIG. 6A.
Figure 7:
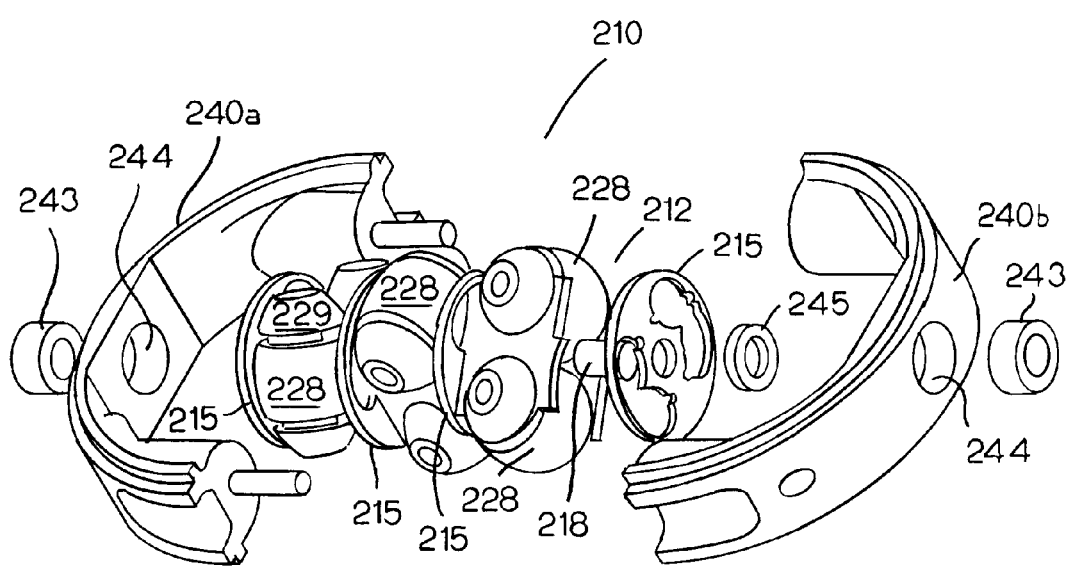
FIG. 7 is an exploded view of the multi-directional roller assembly of FIG. 6A.

Another embodiment of a multi-directional roller assembly 210 is shown in FIGS. 6A-7. The multi-directional roller assembly 210 includes a rotatable frame 212 for mounting one or more sets of mutually-actuating rollers 228. The frame 212 includes a plurality of disk-shaped ribs 215, and is rotatable about a major axis 214. Each set of mutually actuating rollers 228 is mounted in a space between ribs 215. The frame 212 further includes axle nubs 218 extending along the main axis of rotation 214 of the frame 212. In the embodiment of FIGS. 6A-7, each roller 228 comprises a central cylindrical roller 227, rotatable about a minor axis 234, and two side cones 229. Each central cylindrical roller 227 engages by contact a corresponding roller in the set, such that rotation of one roller in the set causes rotation of the corresponding roller in the set, preferably in an opposite direction. Other suitable means for mutual roller actuation, such as gears or magnets, may be used.

The multi-directional roller assembly 210 further includes a housing 240 for rotatably mounting the frame 212 and rollers 228. As shown in FIG. 7, the housing 240 may comprise two mating halves 240a and 240b. The illustrative housing 240 is a disk-shaped, with a central opening 242 for rotatably receiving the frame 212, and axle openings 244 for receiving axle nubs 218. Bearings 243 and washers 245 facilitate rotation of the frame 212 when mounted in the housing 240. The housing 240 of FIGS. 6A-7 is shaped, with a contoured upper surface 248 and a contoured lower surface (not shown).

Figure 8A:
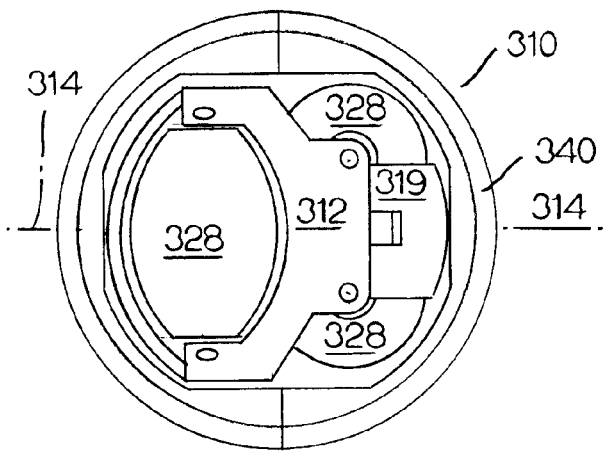
FIG. 8A is a top view of another embodiment of a multi-directional roller assembly, including two pairs of rollers.
Figure 8B:
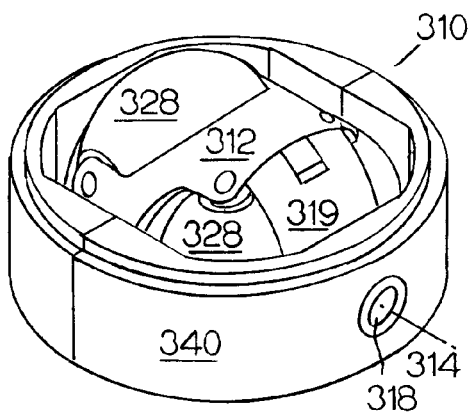
FIG. 8B is a perspective view of the multi-directional roller assembly of FIG. 8A.
Figure 8C:
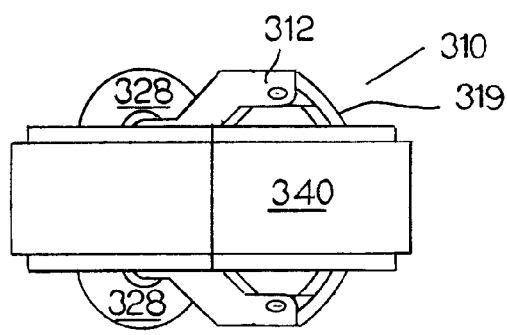
FIG. 8C is a side view of the multi-directional roller assembly of FIG. 8A.
Figure 8D:
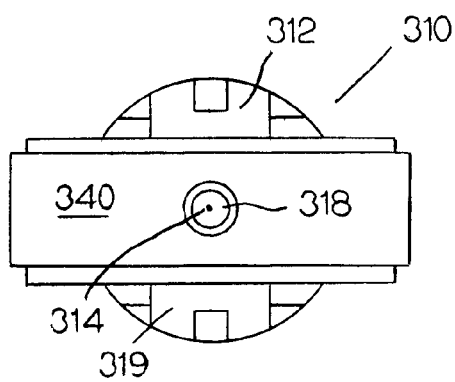
FIG. 8D is front view of the multi-directional roller assembly of FIG. 8A.
Figure 9:
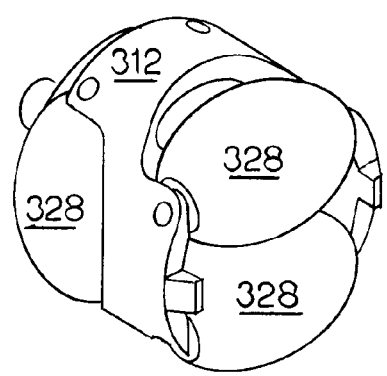
FIG. 9 illustrates the multi-directional roller assembly of FIGS. 8A-8D without an end cover or housing.

As shown in FIGS. 8A-9, a multi-directional roller assembly 310 may include two sets of mutually-actuating rollers 328, each oriented 90° relative to each other on the periphery of a frame 312 mounted in a housing 340. The frame 312 includes axle nubs 318 formed in an end cover 319 and extending along a main axis 314. Each set of rollers 328 in the embodiment of FIGS. 8A-9 comprises a pair of parallel, rotatable rollers having outer surfaces that contact each other to induce rotation in one roller about a transverse minor axis upon rotation of the other roller, though other means for inducing rotation in a corresponding roller may be used.

A multi-directional roller assembly may include any suitable number of sets of mutually-actuating rollers disposed along the length of the frame at various orientations. Each set may comprise any suitable number of rollers, and is not limited to a pair of mutually-actuating rollers in each set.

Figure 10A:
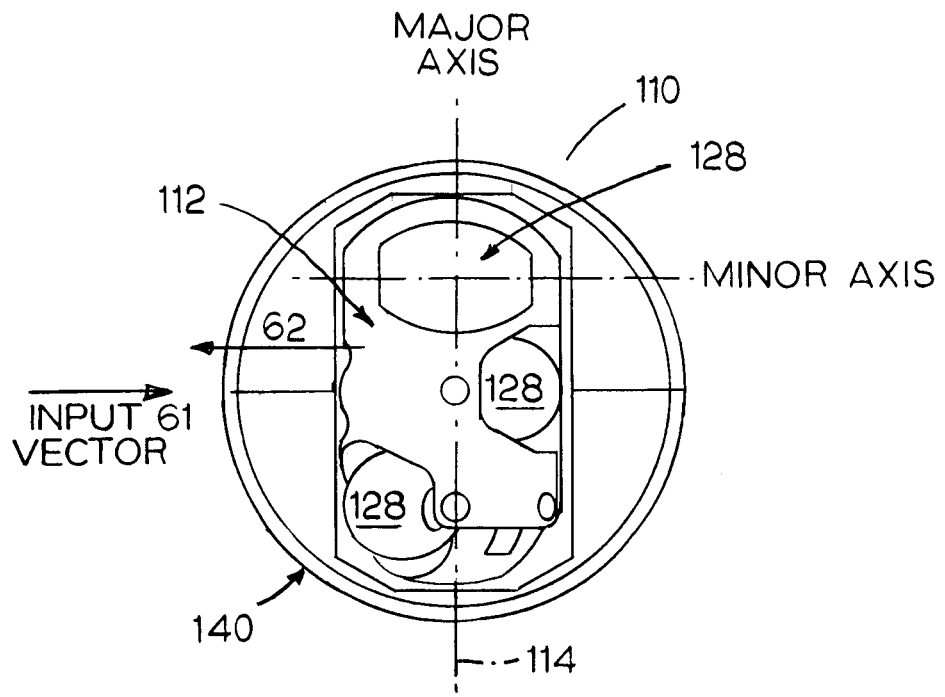
FIG. 10A is a top view of a multi-directional roller assembly when an input force is applied perpendicular to the major axis.
Figure 10B:
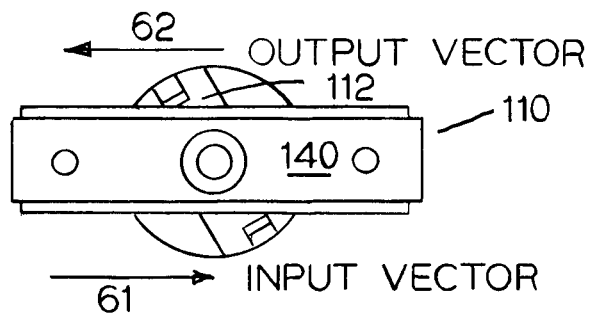
FIG. 10B is a side view of the multi-directional roller assembly of FIG. 10A.

A multi-directional roller assembly can be used to manipulate the orientation and trajectory of an article of conveyance placed on the multi-directional roller assembly. The multi-directional roller assembly can redirect a single input vector to an unlimited angular output vector, capable of directing an article placed on the multi-directional roller assembly in any suitable direction. For example, referring to FIGS. 10A-10B, an input force applied to the bottom side of a multi-directional roller assembly 110, indicated by arrow 61, that is perpendicular to the major axis 114 causes the frame 112 to rotate within the housing 140 about the major axis 114 in the direction of output frame vector 62. The rollers 28 do not rotate about the minor axes 34 under the influence of the input force 61. Thus, the output vector 62 of the assembly is 180° from the input vector 61. When the roller assembly 210 is positioned with the major axis 214 extending 90° relative to the input vector 61, the roller assembly will push an article placed on top of the frame 212 in the direction indicated by the output vector 62, or 180° relative to the input vector 61.

Figure 11A:
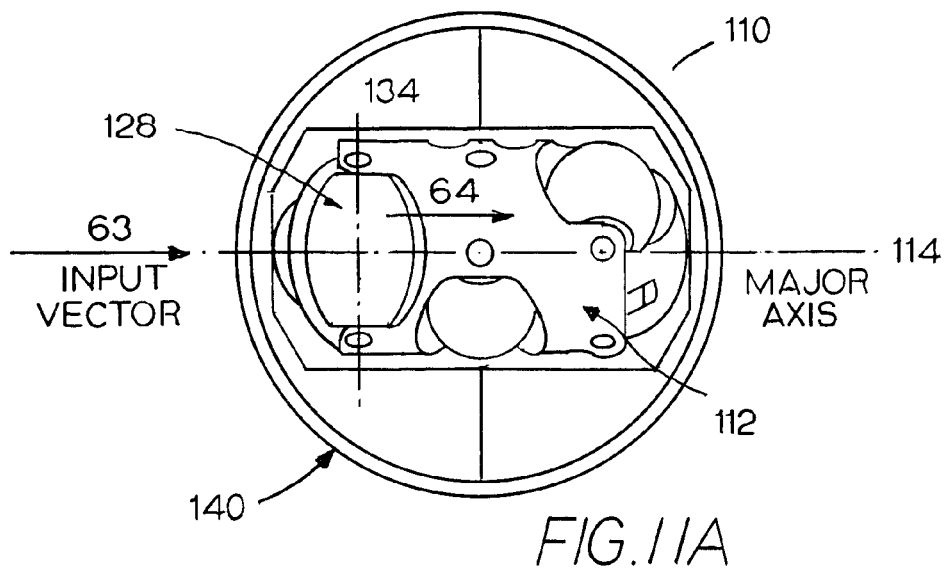
FIG. 11A is a top view of a multi-directional roller assembly when an input force is applied parallel to the major axis.
Figure 11B:
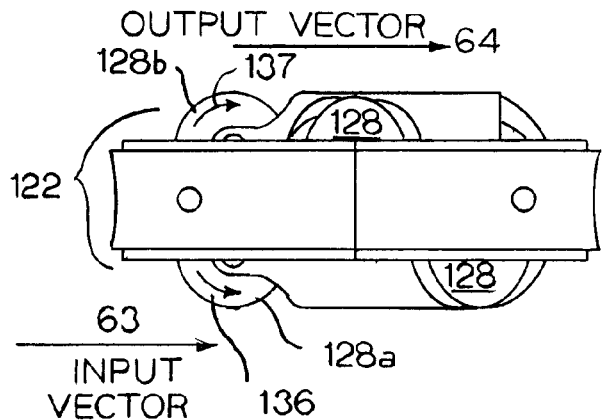
FIG. 11B is a side view of the multi-directional roller assembly of FIG. 11A.

Referring to FIGS. 11A-11B, an input force applied to the bottom side of the assembly 110 that is parallel to the major axis 114 (i.e., oriented at 0°) and perpendicular to at least one of the minor axes 134 will create a different output vector. The input force, indicated by vector 63, will cause rotation of one set of rollers 128, without driving the frame 112. In the embodiment shown in FIGS. 11A and 11B, a first set 122 of rollers 128 is actuated due to the orientation of the frame 112. As shown, the input vector drives a first roller 128a of the first set 122 in a first direction 136, causing rotation of the second roller 128b in a second direction 137. The rotation of the second roller 128b creates an output vector 64 that is parallel to the input vector 63, which propels an article placed on the frame 112 in the direction of the output vector 64. The set of rollers 128 that is actuated depends on the orientation of the frame 112 when the input force is applied. If the frame 112 is oriented such that the middle set of rollers is disposed in a substantially vertical orientation, with the bottom roller in contact with the input force, then the middle set will actuate to create the output vector 64. If the frame is oriented with the third set of rollers rotated into a substantially vertical orientation, the third set actuates to create the output vector 64. Two or more sets of rollers 128 may actuate at the same time to create the output vector 64.

Figure 12A:
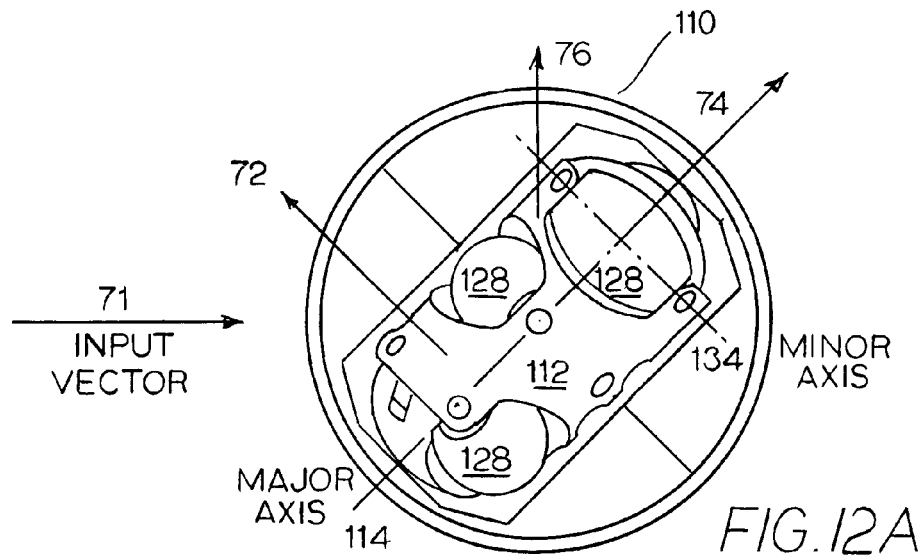
FIG. 12A is a top view of a multi-directional roller assembly when an input force is applied at a 45° angle to the major axis.
Figure 12B:
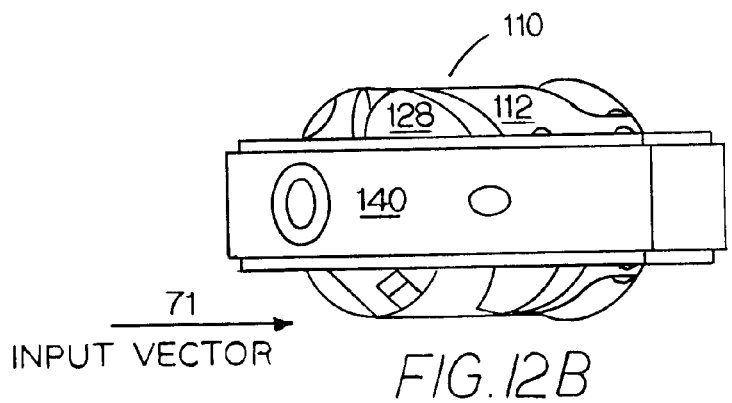
FIG. 12B is a side view of the multi-directional roller assembly of FIG. 12A.

Referring to FIGS. 12A-12B, an input force that is oblique to both the major axis 114 and minor axes 134 causes rotation of both the rollers 128 and roller frame 112 to create an output vector that is a combination of the output vectors of the frame 112 and the rollers 128. In the embodiment of FIGS. 12A and 12B, the input vector 71 indicative of an input force is oriented 45° relative to the major axis 114. The force along input vector 71 causes rotation of the frame 112 about the major axis 114 to create a frame output vector 72 that is perpendicular to the axis 114. The input vector 71 also causes rotation of one or more sets of the rollers 128 to create a roller output vector 74 that is perpendicular to the minor axis 34. The combined output vector 76 extends 90° relative to the input vector 71, so that an object placed on the assembly 110 will be directed off the assembly at a 90° angle relative to the input force 71.

A desired output angle of an object disposed on the multi-directional roller assembly may be achieved through orienting a multi-directional rollers assembly at a particular angle relative to the input force. The illustrative assembly produces a 1:2 ratio between the angular input vector and the angular output vector. Other ratios may be contemplated. When the input vector changes by 90°, the resultant output vector will change by 180°.

Figure 14:
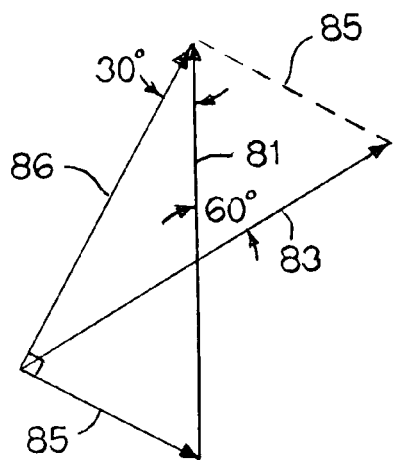
FIG. 14 illustrates the relationship between an input vector, a frame output vector, a roller output vector and an assembly output vector for the multi-directional roller assembly of FIG. 13.
Figure 13:
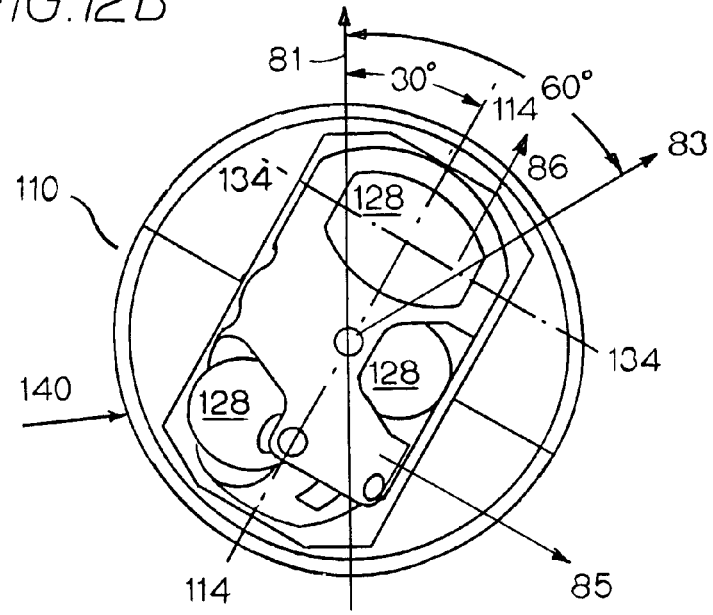
FIG. 13 is a top view of a multi-directional roller assembly when an input force is applied at a 30° angle relative to the major axis.

For example, as shown in FIG. 13, when a multi-directional roller assembly 110 is oriented at a 30° angle relative to an input vector 81, the output vector 83, which is a combination of the frame output vector 85 and the roller output vector 86, will extend at 60° (twice the input angle) relative to the input vector 81. FIG. 14 illustrates the relationship between the input vector 81, the frame output vector 85, the roller output vector 86, and the overall output vector 83 for the entire assembly. An input vector 81 extending 30° relative to the major axis 114, will create a frame output vector 85 that is perpendicular to the axis 114 and equal in magnitude to half the input vector (sin 30°). The input vector 81 also creates a roller output vector 86 that extends parallel to the major axis 114 and equal in magnitude to 0.866 of the input vector 81 (cos 30°). When added together, the frame output vector 85 and roller output vector 86 create the assembly output vector 83, extending at 60° relative to the input vector 81 and equal in magnitude to the input vector 81. Therefore, an object placed on the assembly 110, which is oriented at a 30° angle relative to the input vector 81, will be diverted off the assembly at an angle of 60° from the input force acting on the assembly.

Figure 15A:
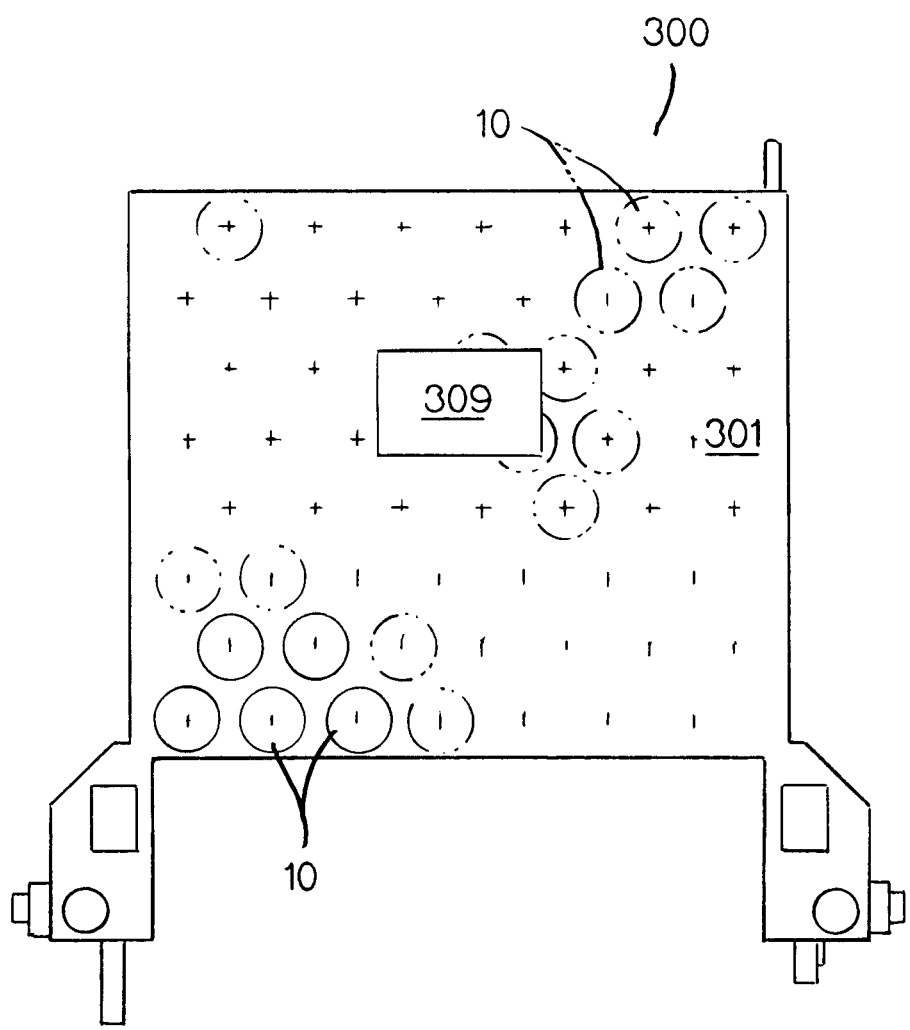
FIG. 15A is a top view of a roller plate housing an array of multi-directional roller assemblies according to an illustrative embodiment of the invention.
Figure 15B:
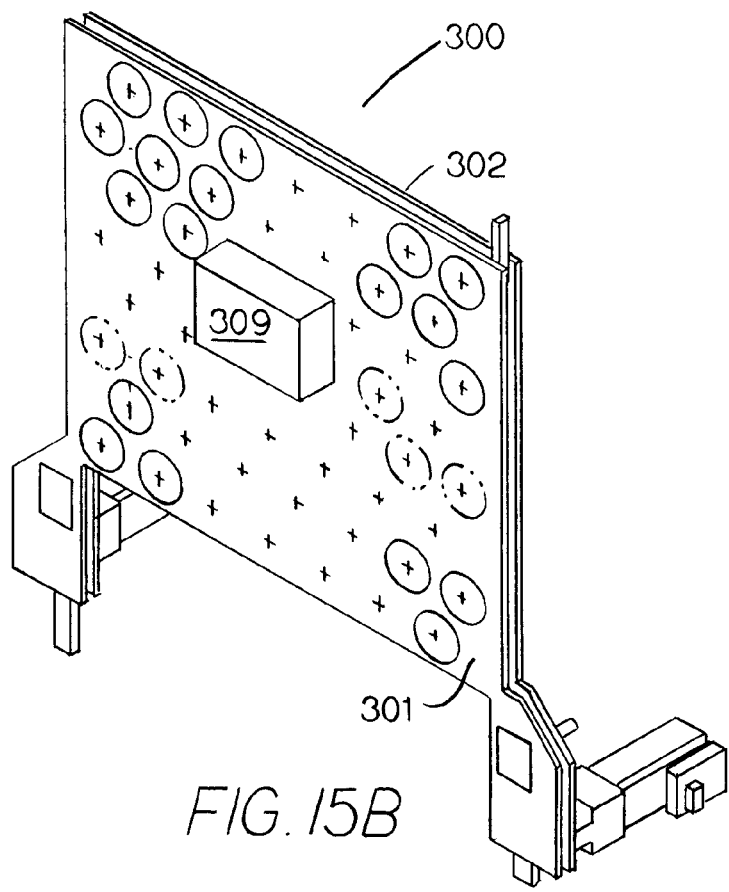
FIG. 15B is a perspective view of the roller plate of FIG. 15A.
Figure 15C:
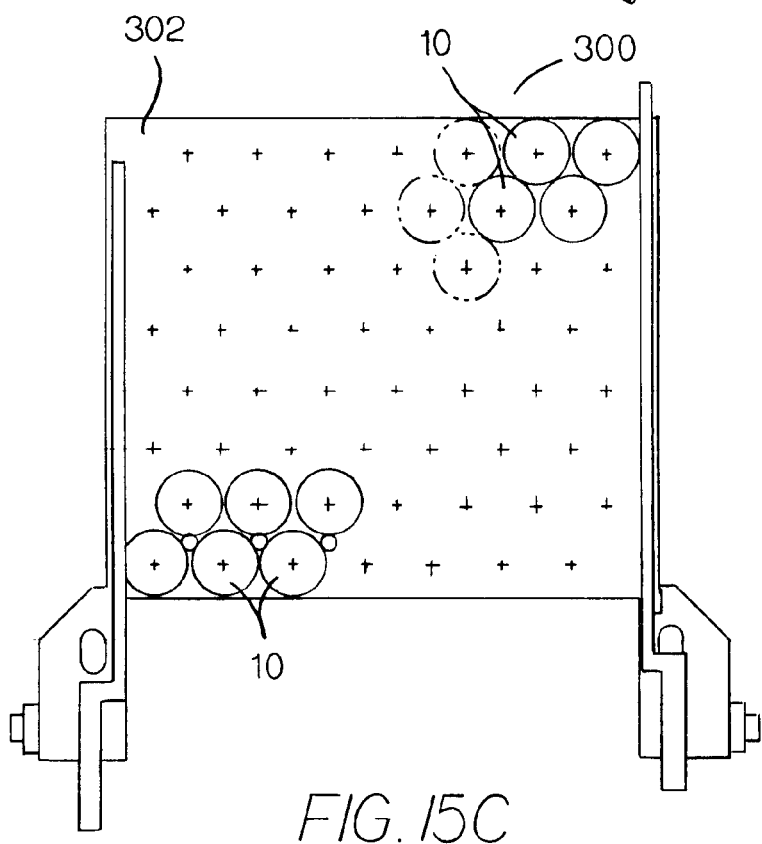
FIG. 15C is a top view of the roller plate of FIG. 15A with the top plate removed.
Figure 16:
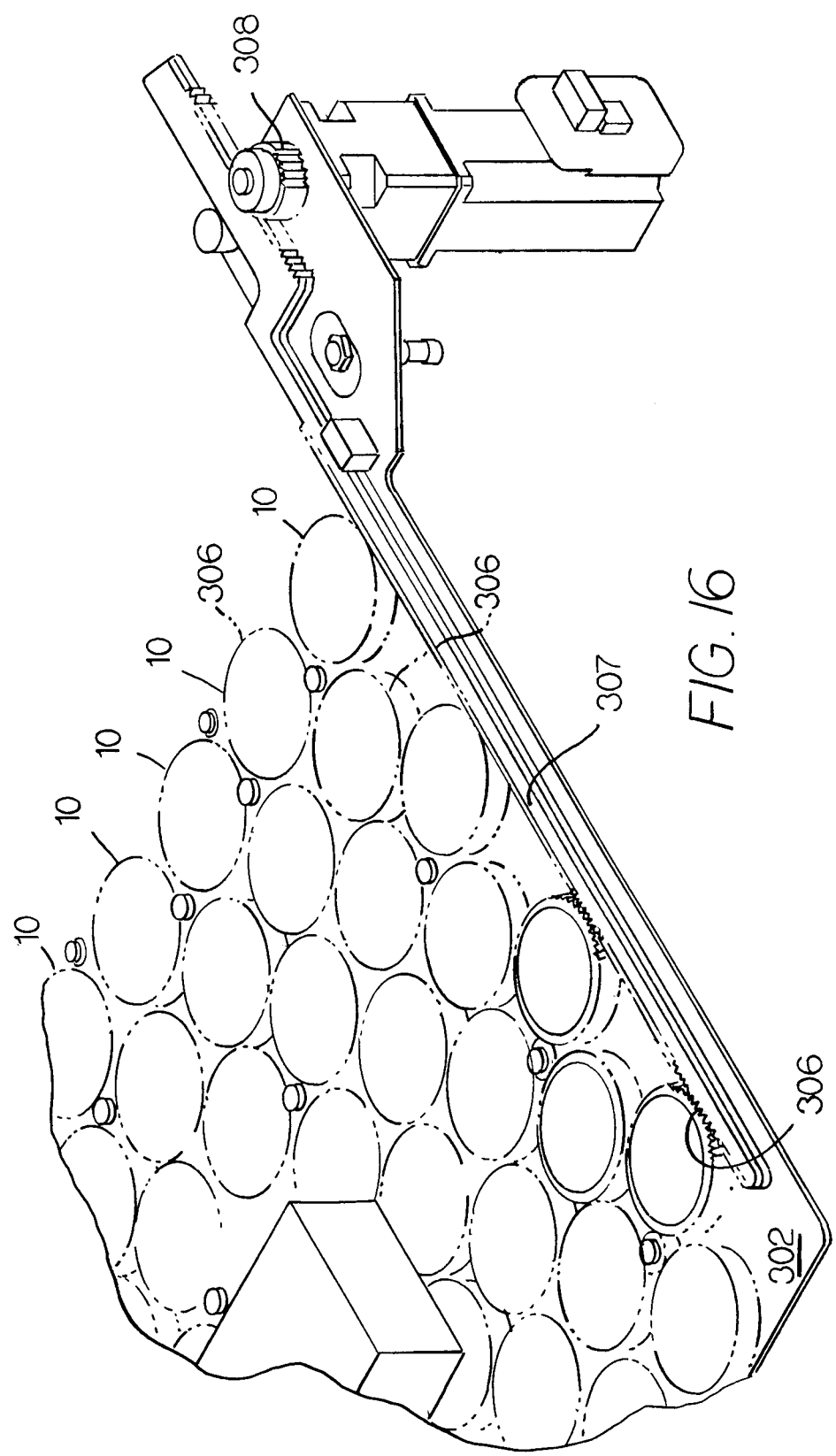
FIG. 16 is a detailed view of the roller plate of FIG. 15A with the top plate removed and showing a rack gear for orienting the multi-directional roller assemblies.

In one application, an array of multi-directional roller assemblies may be mounted in a roller plate to form a diverting roller plate for articles of conveyance. For example, as shown in FIGS. 15A-15C, a roller plate 300 capable of diverting objects may comprise an array of multi-directional roller assemblies 10 mounted between an upper plate 301 and a lower plate 302. The rollers 28 and frames 12 of the roller assemblies protrude through openings in the upper plate 301 and lower plate 302. The array of roller assemblies may have any suitable size, shape, number of roller assemblies or configuration. FIG. 16 shows the roller plate 300 with the top plate 301 removed. As shown, the roller plate 300 includes small spur gears 306 between the multi-directional roller assemblies 10. The spur gears 306 engage the teeth 41 on the perimeter of the roller assemblies, connecting the assemblies together. A rack gear 307 or other suitable actuation means extends along the side of the roller plate 300, engaging the outermost roller assemblies. A drive gear 308 engages the rack gear 307. An actuator rotates the drive gear 308 to impart motion on the rack gear 307, which causes rotation of the assemblies as a group and allowing controlled orientation of the multi-directional roller assemblies 10 relative to the upper plate 301 and lower plate 302. Thus, the entire array of roller assemblies may be oriented at a selected angle to control the trajectory of an article 309 placed on the roller plate 300.

Any suitable means for orienting a multi-directional roller assembly in a selected orientation relative to an input force to control an output trajectory may be used. For example, magnets, motors or other types of gears may be used to orient a multi-directional roller assembly.

Figure 17A:
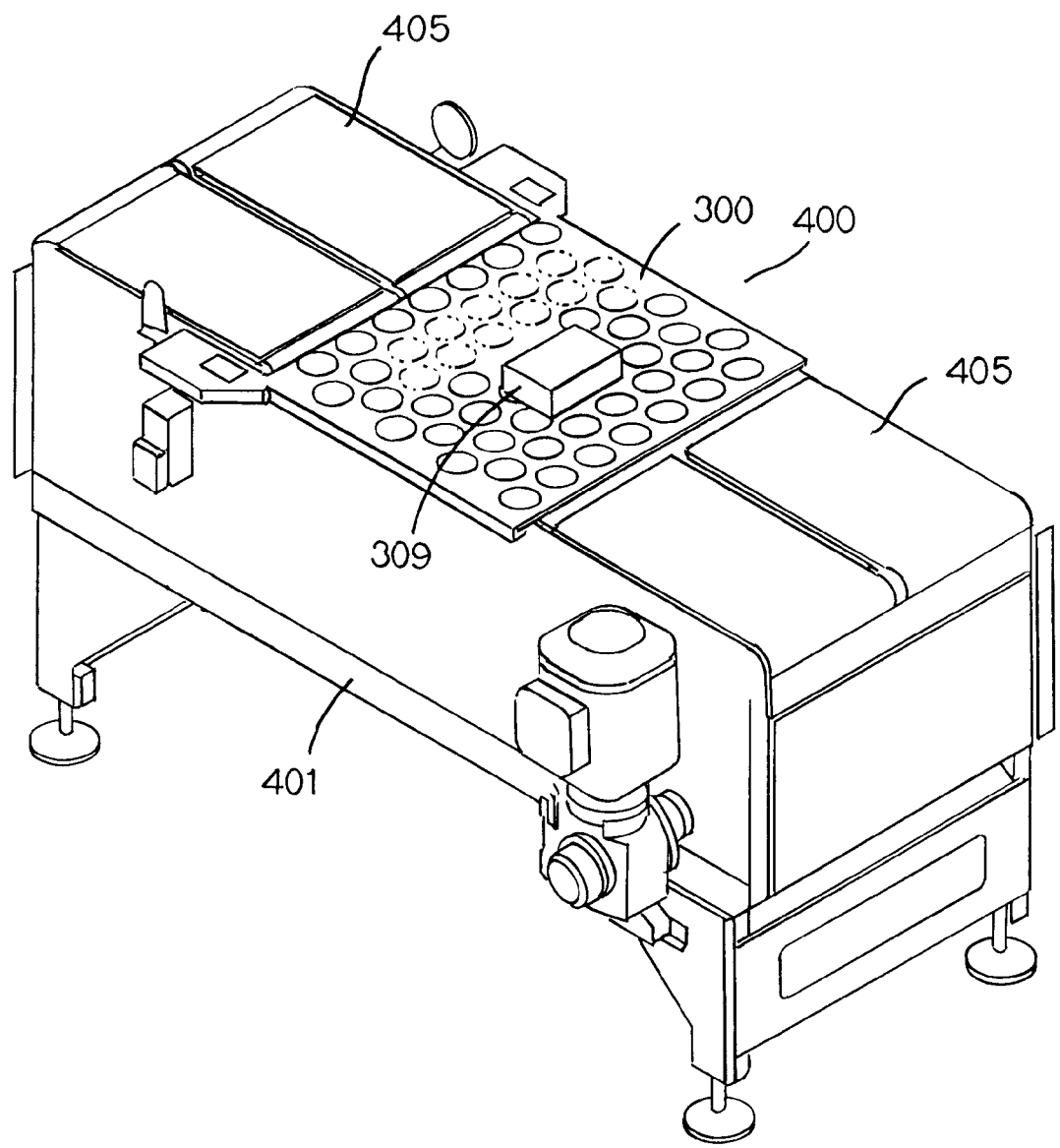
FIG. 17A is perspective view of a conveyor system employing a plurality of roller plates housing arrays of multi-directional roller assemblies.
Figure 17B:
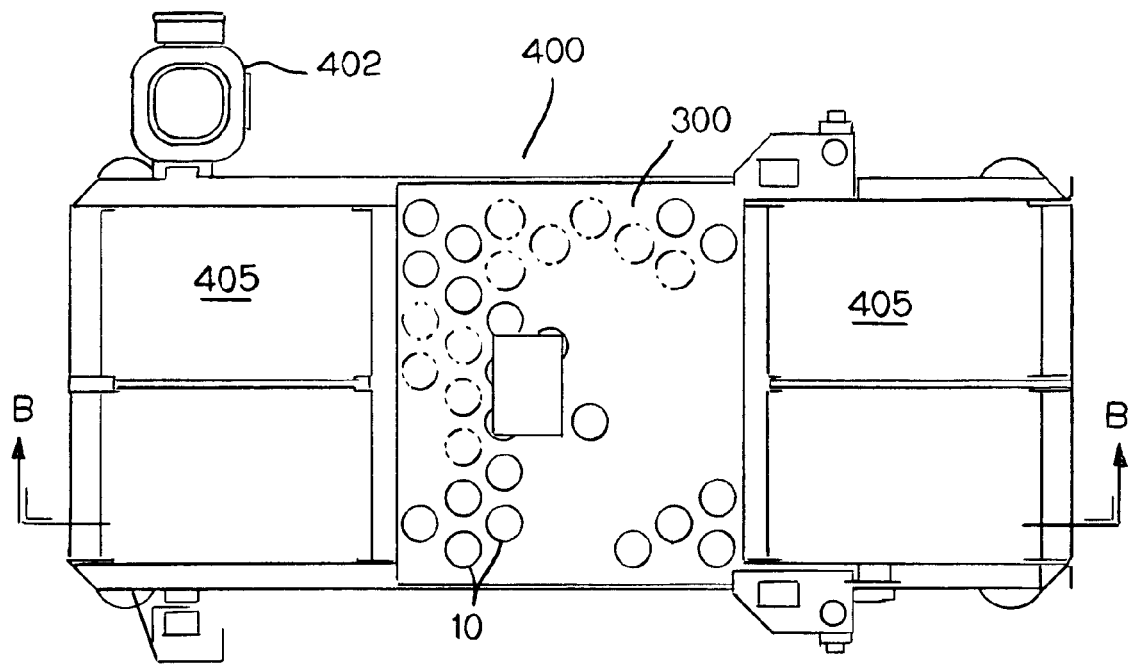
FIG. 17B is a top view of the conveyor system of FIG. 17A.
Figure 17C:
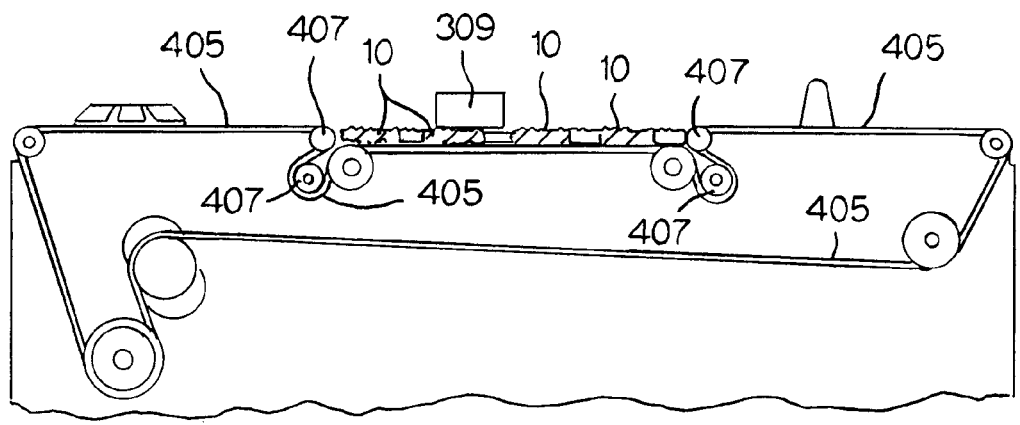
FIG. 17C is a partial cross-sectional view of the conveyor system of FIG. 17B along lines B-B.
Figure 18:
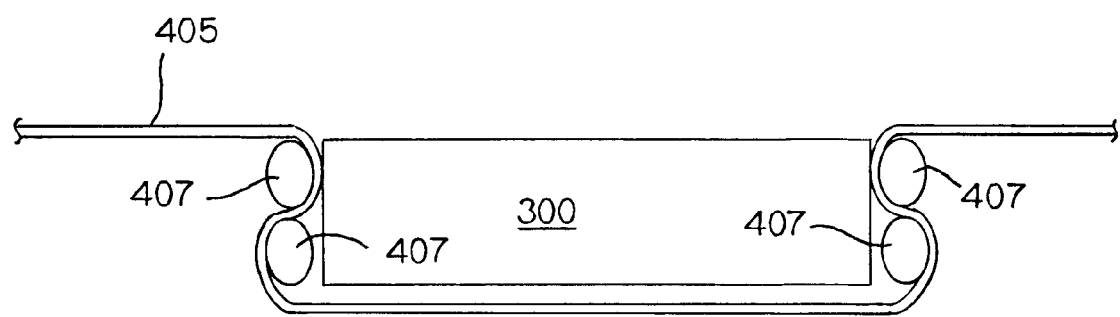
FIG. 18 is a schematic view of a conveyor system including a drop-in roller plate housing an array of multi-directional roller assemblies.
Figure 19A:
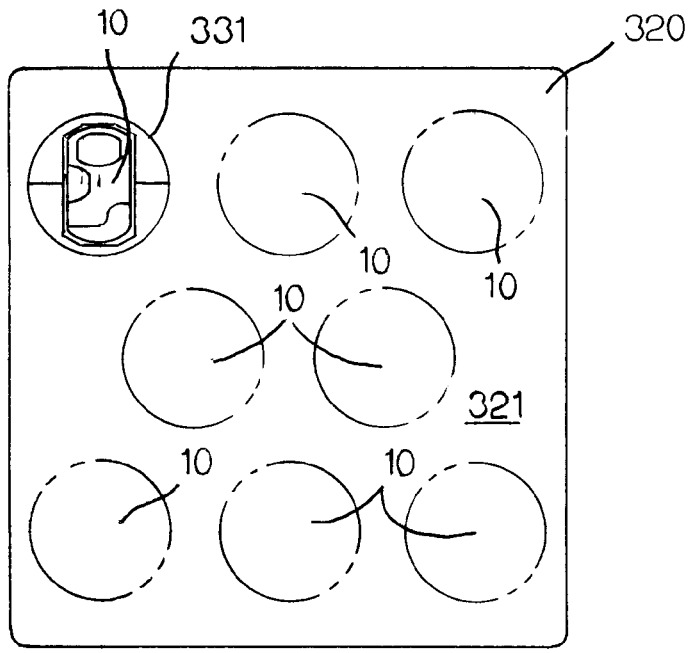
FIG. 19A is a top view of a roller plate housing an array of multi-directional roller assemblies according to another embodiment of the invention.
Figure 19B:
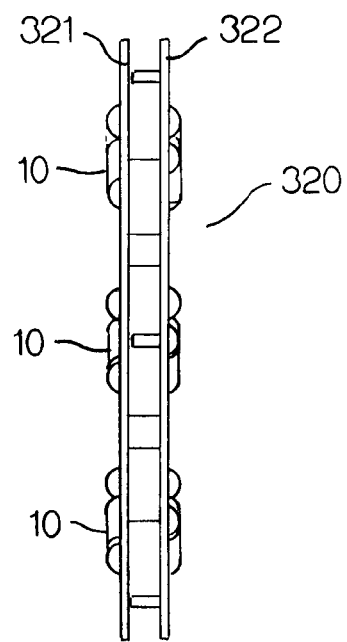
FIG. 19B is a side view of the roller plate of FIG. 19A.
Figure 19C:
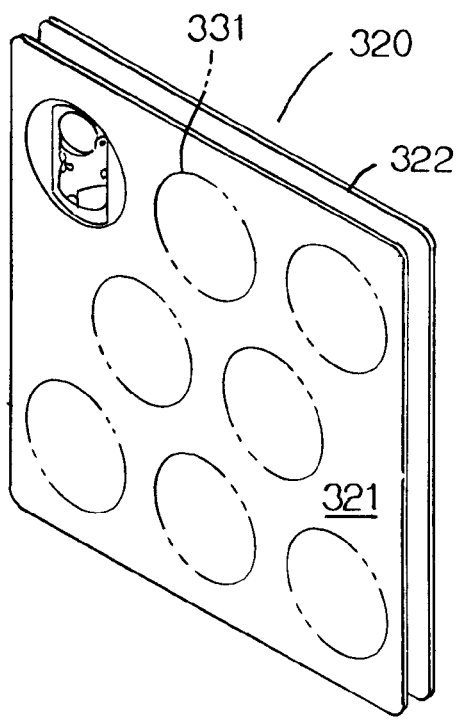
FIG. 19C is a perspective view of the roller plate of FIG. 19A.
Figure 19D:
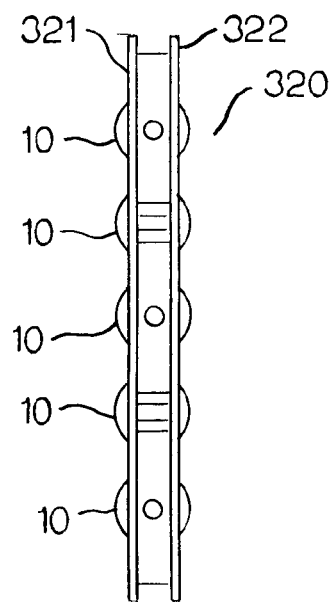
FIG. 19D is a front view of the roller plate of FIG. 19A.

As shown in FIGS. 17A-17C, a roller plate 300 housing an array of multi-directional roller assemblies may be implemented in a conveying system 400 for conveying products and may have a number of useful applications in the conveying system. The conveying system 400 includes a frame 401 and one or more conveyor belts 405 trained around rollers and-or sprockets. The conveyor belt 405 conveys articles to the roller plate 300 and transfers articles onto the roller plate 300. The conveyor belt 405 is diverted below the roller plate 300 by rollers 407. Below the roller plate 300, the conveyor belt 405 forms a driver for applying an input force along a selected direction to actuate the multi-directional roller assemblies 10, as shown schematically in FIG. 18. Alternatively, the rollers 28, the frame 12 or both may be actively driven through a motor, magnets, gears or other suitable means.

An actuator 402 controls the orientation of the roller assemblies in the roller plate 300. The orientation of the roller assemblies relative to the conveyor belt 405 determines the output trajectory of an article 309 placed on top of the roller plate.

The conveyor belt 405 is diverted back up at the end of the roller plate 300 to receive and convey articles away from the roller plate 300.

The conveyor belt 405 may be a flat belt, a belt with integrated rollers, a belt with integrated balls, or any other suitable type of conveyor belt.

The belt 405 may be selectively engageable and disengageable with the multi-directional roller assemblies on the underside of the roller plate through any suitable actuation means.

The invention is not limited to the use of a conveyor belt as a driver for a multi-directional roller assembly, and other suitable drivers may be used.

FIGS. 19A-19D show another embodiment of a roller plate 320 housing an array of multi-directional roller assemblies 10 according to another embodiment of the invention. The roller plate 320 comprises an upper plate 321 having openings 331 for the roller assemblies and a lower plate 322 having openings for the roller assemblies, such that salient portions of each roller assembly protrude above the upper plate 321 and below the lower plate 322. In the embodiment shown in FIGS. 19A-19D, the roller plate 320 includes eight roller assemblies each oriented similarly, but the invention is not limited to the illustrative configuration.

Figure 20A:
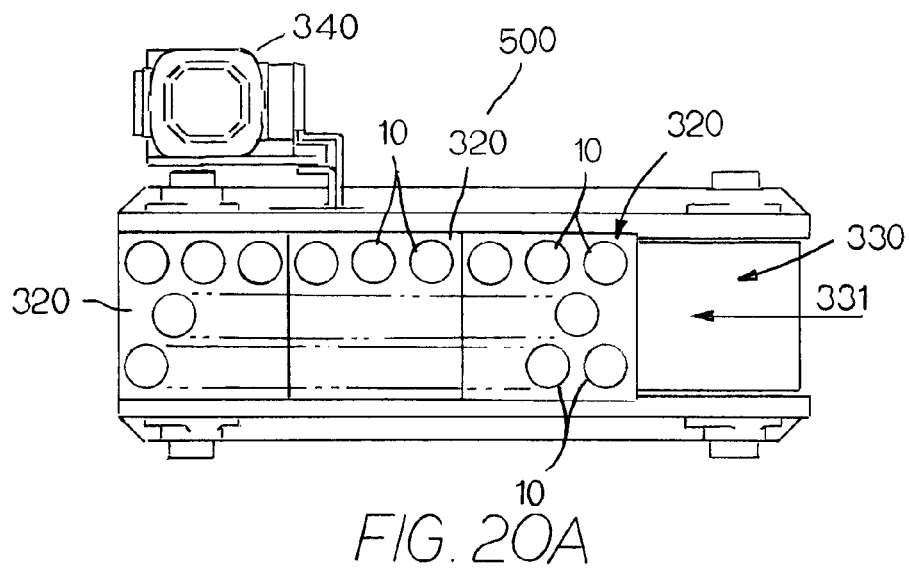
FIG. 20A is a top view of a conveyor system employing the roller plate of FIG. 19A.
Figure 20B:
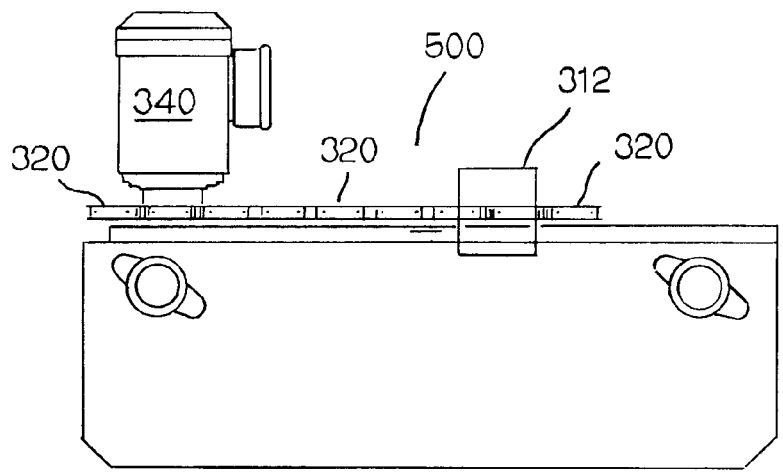
FIG. 20B is a side view of the conveyor system of FIG. 20A.
Figure 21:
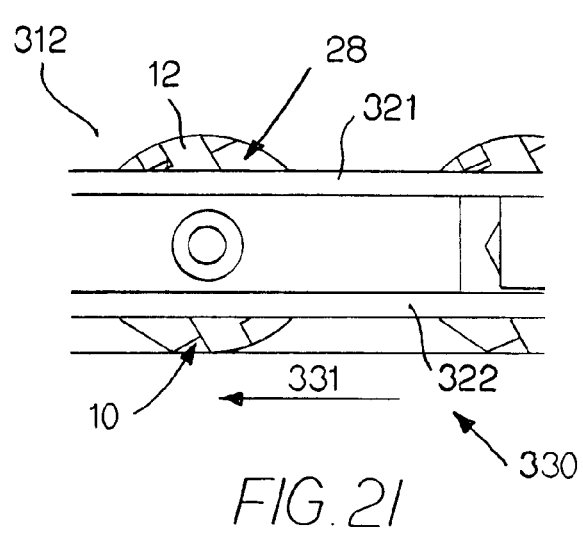
FIG. 21 is a detailed view of section 312 of FIG. 20B.

Referring to FIGS. 20A, 20B and 21, another embodiment of a conveying system 500 employs a plurality of roller plates 320 housing multi-directional roller assemblies 10. The conveying system 500 comprises an array of multi-directional roller assemblies for directing products in a selected direction. The array may comprise a plurality of roller plates 320, each roller plate 320 housing an array of multi-directional roller assemblies 10. The conveying system 300 further includes a driver, illustrated as a conveyor belt 330 moving in the direction of the arrow 331, for applying an input force along a selected direction to actuate the multi-directional roller assemblies 10. Alternatively, the rollers 28, the frame or both may be actively driven through a motor or other suitable means.

An actuator 340 controls the orientation of the multi-directional roller assemblies relative to the conveyor belt 330. The actuator 340 may rotate the entire roller plate 320 and change the orientations of each array of multi-directional roller assemblies to change the orientation of the conveyance. Alternatively, an actuator may control a single multi-directional roller assembly. As previously described, changing the orientation of the multi-directional roller assembly changes the output vector of an article placed on the roller assembly. The actuator 340 may be an electric, pneumatic, or other suitable type of actuator.

As shown in FIG. 21, the conveyor belt 330 contacts the frame 12 and exposed roller 28 of the assembly 10 to drive the multi-directional roller assembly 10, causing rotation of the frame 12, the rollers 28 or both. Each multi-directional roller assembly 10 is housed in a roller plate between an upper plate 321 and a lower plate 322. Depending on the orientation of the assembly 10, an article placed on the roller assembly 10 will be directed in an output direction that extends at an output angle relative to the conveyor belt direction 331 that is twice the angle at which the major axis 14 of the roller assembly 10 extends relative to the conveyor belt direction 331.

Figure 22:
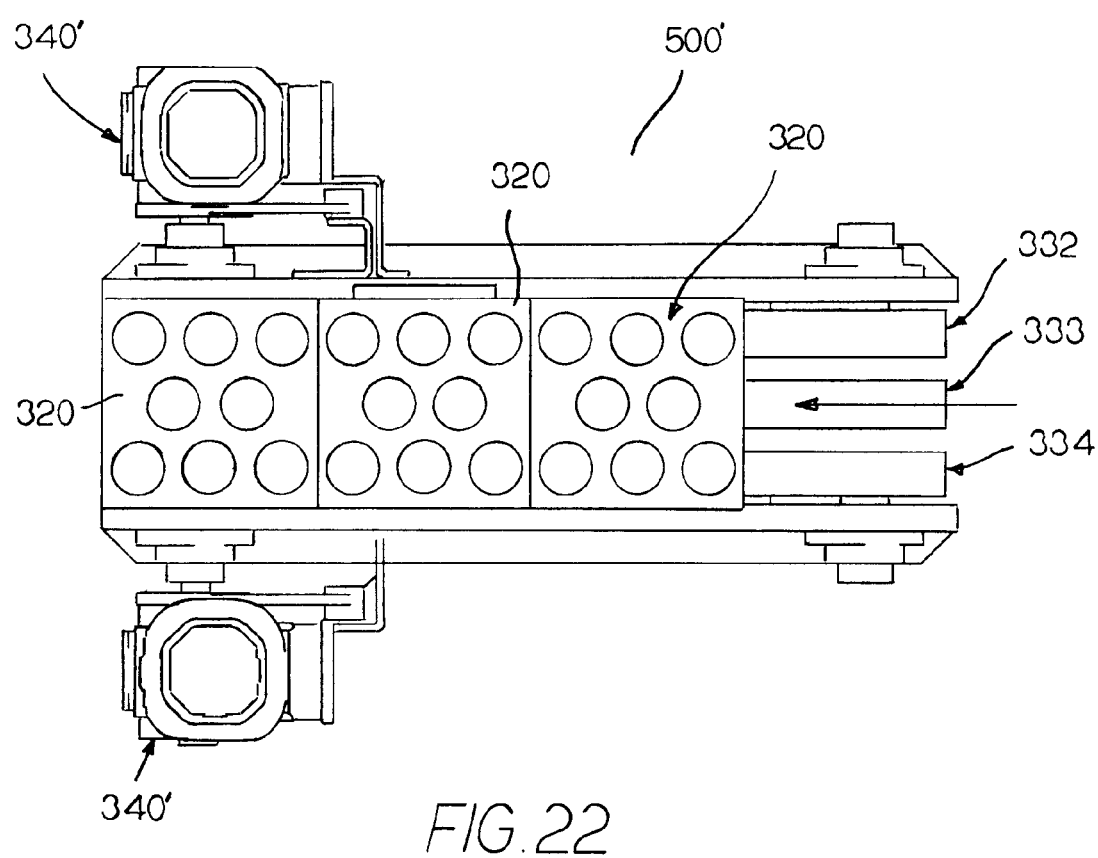
FIG. 22 is a top view of an alternate embodiment of a conveyor system having multiple driving conveyor belts and employing a plurality of roller plates housing arrays of multi-directional roller assemblies.

As shown in FIG. 22, a conveyor system 500' including an array of multi-directional roller assemblies may include a plurality of conveyor belts 332, 333, 334 for driving the multi-directional roller assemblies. In the embodiment of FIG. 22, multiple actuators 340' may be used to change the orientations of the roller plates 320 housing multi-directional roller assemblies relative to the conveyor belts 332, 333, 334.

The conveyor system may employ any suitable means for controlling the angular orientation of the multi-directional roller assemblies to control the trajectory of articles conveyed through the system.

FIGS. 23A and 23B illustrates an approach for orienting an array of multi-directional roller assemblies. As shown in FIGS. 23A and 23B a roller plate 600 suitable for implementing in a conveyor system includes an array of multi-directional roller assemblies 10 housed between an upper plate 621 and a lower plate 622. Each roller assembly housing 40 includes a pinion gear 640 for engaging a gear rack 650 on the upper plate 621. The gear rack 650 may alternatively be located on the lower plate 622 or between the upper plate 621 and lower plate 622. An input actuator (not shown) selectively moves the gear rack 650, which causes each multi-directional roller assembly 10 to rotate relative to the upper plate 621 and lower plate 622. FIG. 24 is a detailed view section 615 of FIG. 23A, showing the gear rack 650 engaging the pinion gear 440 on the periphery of the assembly housing 40 to control the orientation of the multi-directional roller assemblies.

Figures 25A, 25B:
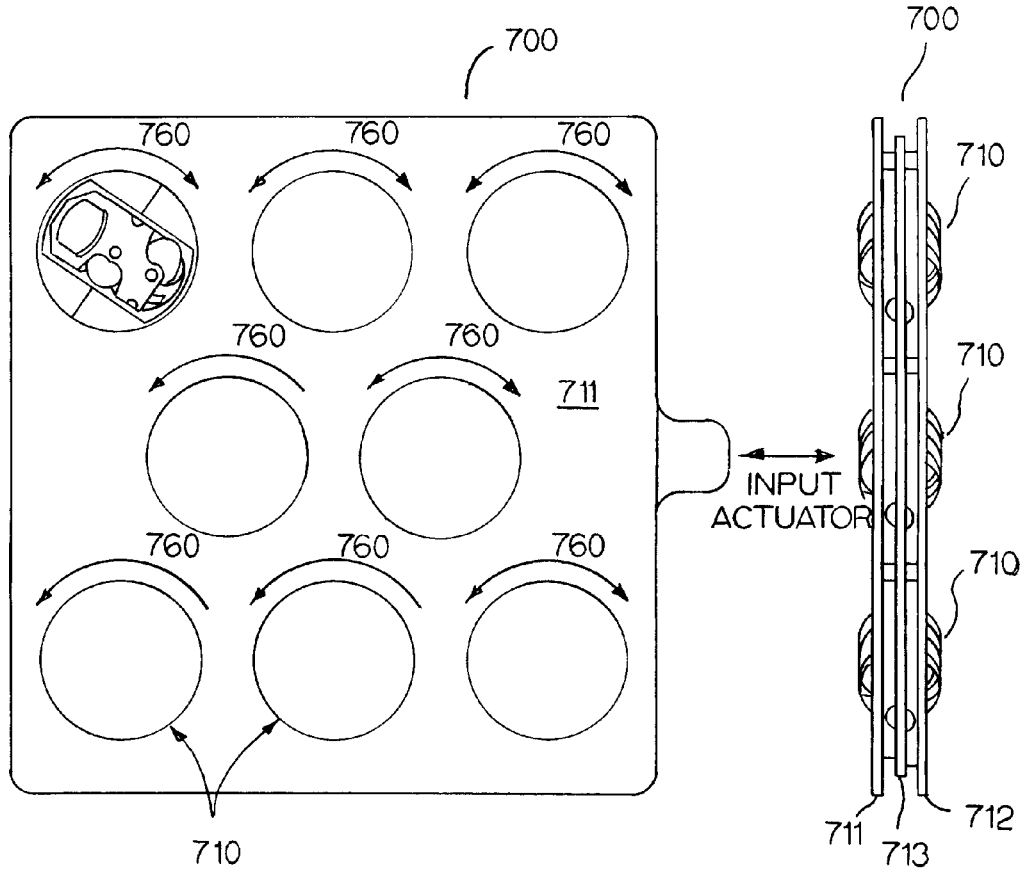
FIGS. 25A and 25B are top and side views of a roller plate that employs a cam ring to orient an array of multi-directional roller assemblies housed therein.
Figure 26A:
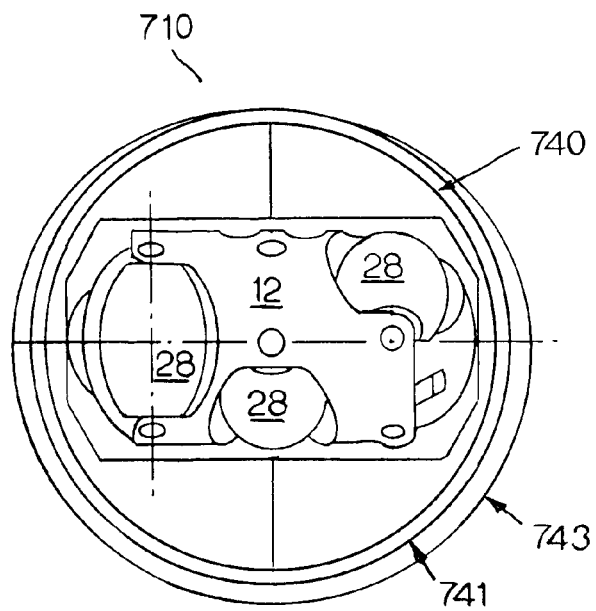
FIGS. 26A-26D illustrate a multi-directional roller assembly including an offset cam ring, suitable for use in the roller plate of FIGS. 25A and 25B.
Figure 26B:
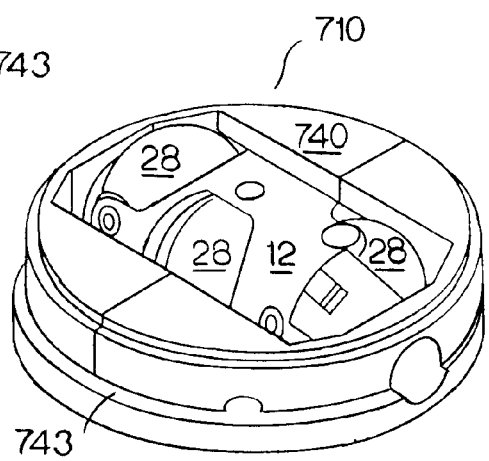
Figure 26C:
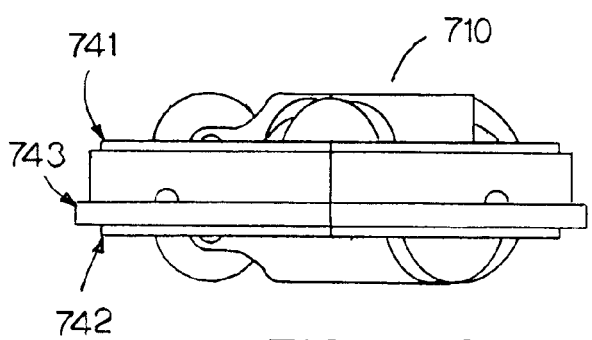
Figure 26D:
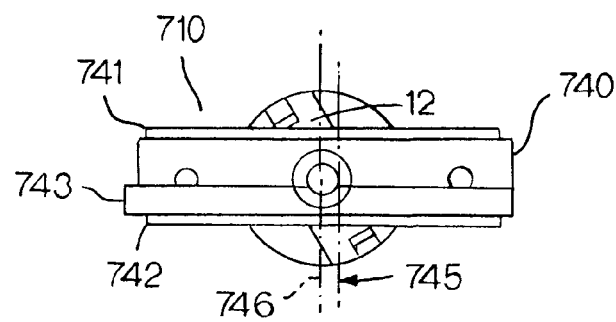

According to another embodiment of the invention, shown in FIGS. 25A-25B and 26A-26D, a camming action may be used to orient an array of multi-directional roller assemblies. FIGS. 25A and 25B illustrate a roller plate 700 including an array of multi-directional roller assemblies 710. The roller plate 700 includes a upper plate 711, a lower plate 712, and a cam plate 713 laced between the upper and lower plate. As shown in FIGS. 26A-D, the roller housing 740 for each roller assembly 710 may include an upper plate centering ring 741 for centering the assembly within the upper plate 711, a lower plate centering ring 742 for centering the assembly within the lower plate 712 and a cam plate ring 743. The cam plate ring 743 has an axis 745 that is offset from the rotational axis 746 of the housing 740. An actuator may selectively rotate the cam plate 713, which will cause rotation of the roller assemblies 710 mounted in the roller plate 710 as a group, as indicated by arrows 760, allowing controlled orientation of the multi-directional roller assemblies relative to the upper plate 711 and lower plate 712.

FIGS. 27A, 27B, and 27C illustrate a roller plate 800 including an array of multi-directional roller assemblies 10 according to another embodiment of the invention. The illustrative plate 800 is circular and houses seven roller assemblies 10 in three rows. The plate 800 includes an upper plate 811 and lower plate 812 for mounting the roller assemblies 10. Each assembly housing 40 includes gear teeth 41 disposed about the perimeter to create a large spur gear. Secondary smaller spur gears 842 are disposed between the multi-directional roller assemblies. A driven gear 843 is coupled to a rotary actuator. When the rotary actuator rotates the driven gear 643, the gears 642, 643 and gear teeth 641 transmit the rotational motion to all of the roller assemblies, causing rotation of the assemblies as a group and allowing controlled orientation of the multi-directional roller assemblies 10 relative to the upper plate 811 and lower plate 812.

Figure 28:
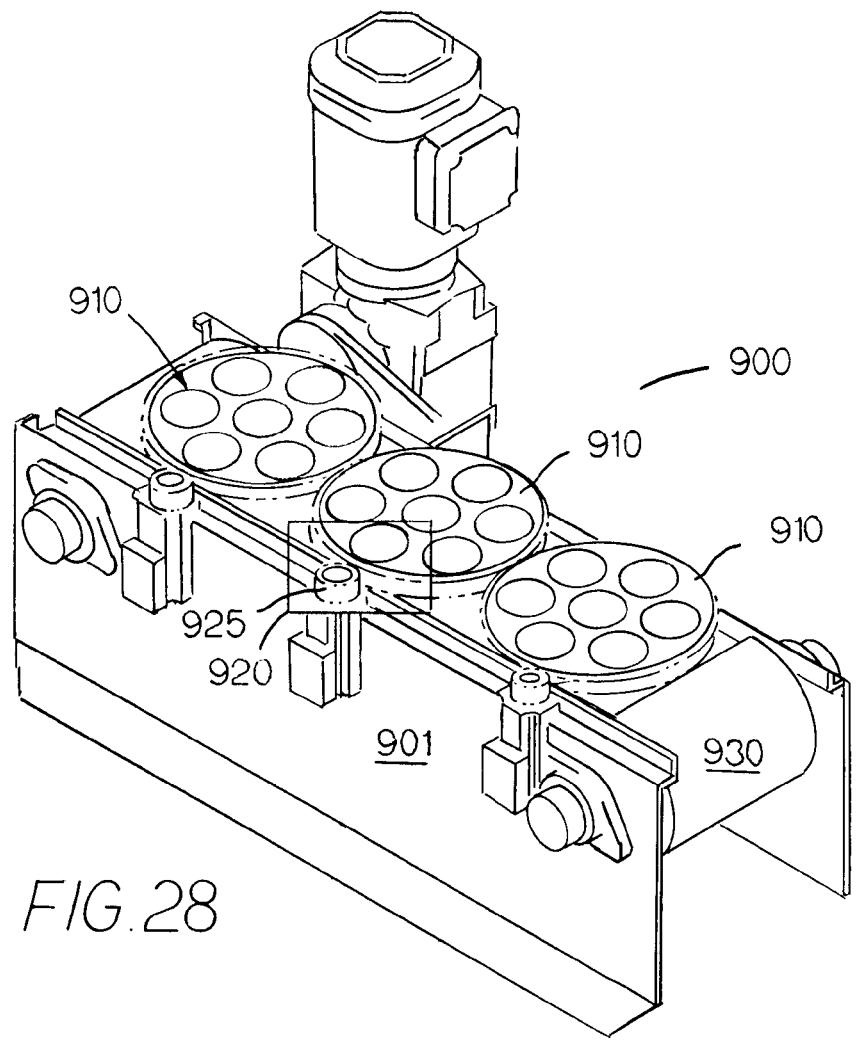
FIG. 28 illustrates a conveyor system employing roller plates housing an array of multi-directional roller assemblies.
Figure 29:
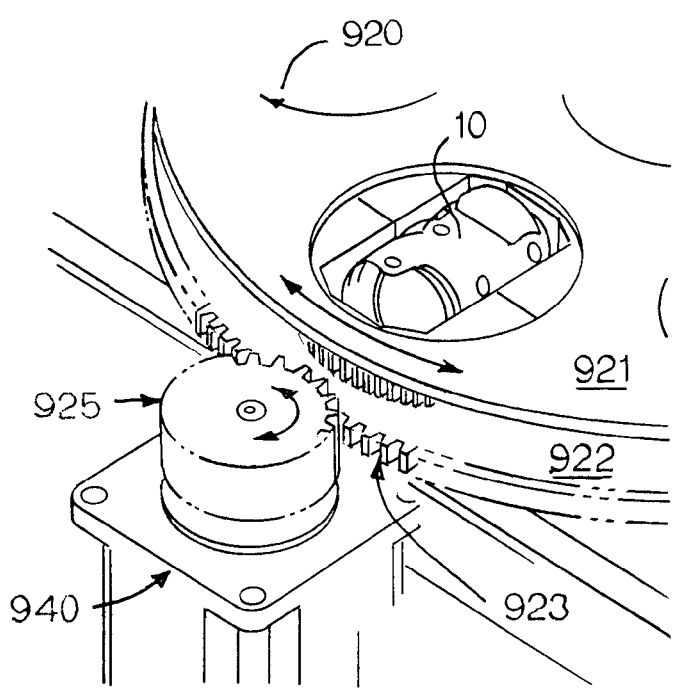
FIG. 29 is a detailed view of region 920 of the conveyor system of FIG. 28.

FIG. 28 illustrates a conveying system 900 including a plurality of roller plates 910, each housing an array of multi-directional roller assemblies 10. The illustrative conveying system 900 is used to change the orientation of an article of conveyance. The conveying system 900 includes a frame or housing 901 and a plurality of circular roller plates 910, each housing an array of multi-directional roller assemblies 10. A conveyor belt 930 running below the roller plates 910 drives the multi-directional roller assemblies 10. Each roller plate 910 includes an upper plate 921 and a lower plate 922 as shown in detail in FIG. 29. The lower plate 922 includes gear teeth 923 about its periphery for engaging a spur gear 925. An actuator 940 selectively rotates the spur gear 925 to change the orientation of the array of multi-directional roller assemblies. While the embodiments of FIGS. 28 and 29 show gear teeth 923 on the lower plate 922 of the roller plate 910, the upper plate 921 may also or alternatively include gear teeth for engaging a gear to change the orientation of the roller plate 910.

A multi-directional roller assembly 10 may perform a number of different functions, such as, but not limited to, sortation, alignment, switching, and turning of articles. For example, a plurality of multi-directional roller assemblies may be used to sort articles passing through a conveying system with minimum collisions between the articles. To sort the articles, the multi-directional roller assemblies are selectively rotated in groups arrayed along the conveying system's carryway. A conveyor belt or other driver runs below the multi-directional roller assemblies. A control system creates an image of an incoming article of conveyance, computes trajectories along the system for each article, and orients the multi-directional roller assemblies according to the trajectories to orderly and rapidly divert articles from the carryway.

Figure 30A:
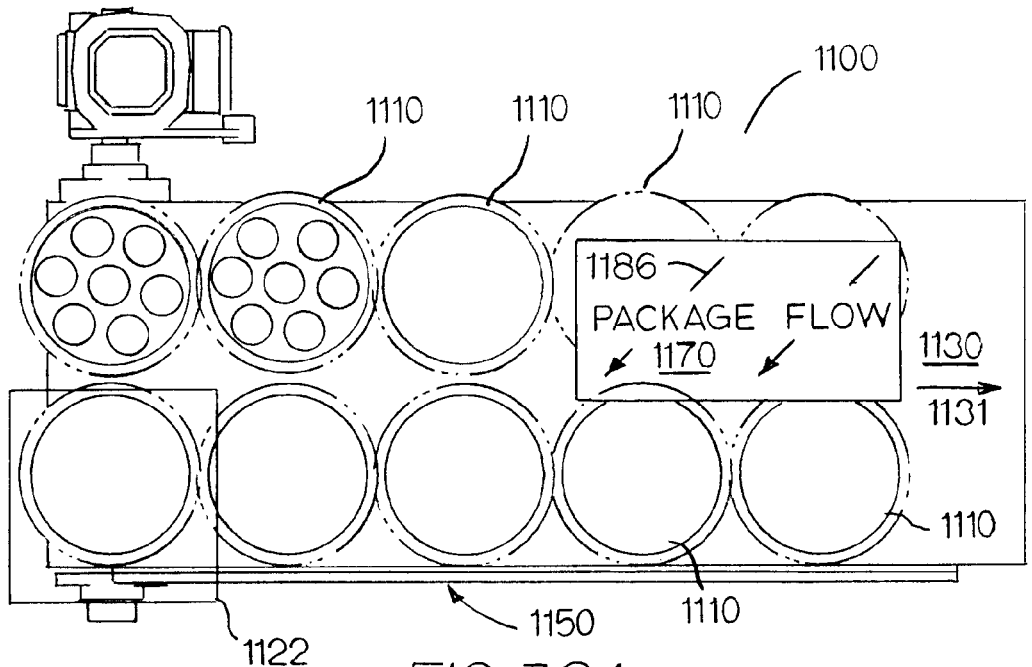
FIGS. 30A and 30B are top and side views of a conveyor system employing roller plates housing an array of multi-directional roller assemblies to align articles of conveyance.
Figure 30B:
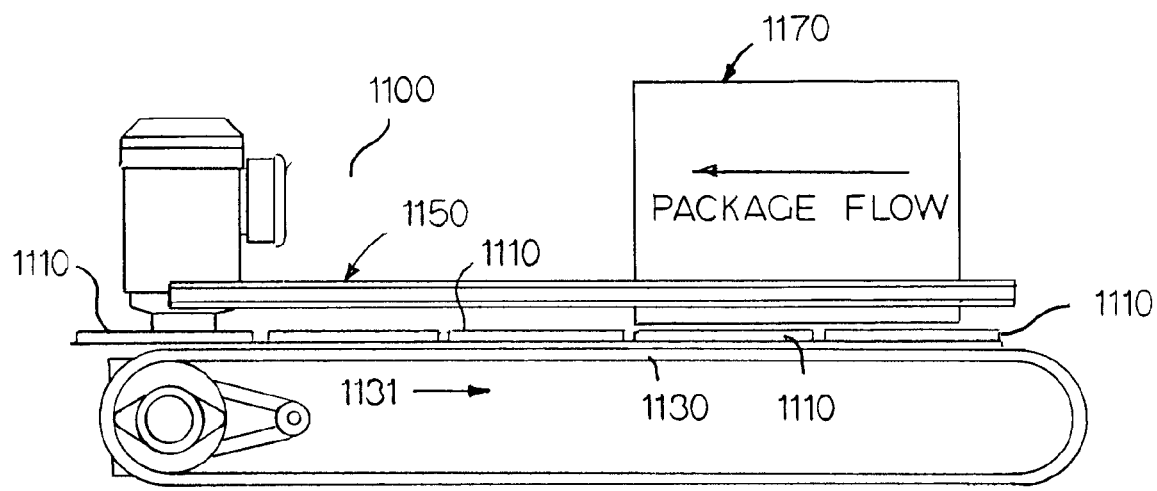
Figure 31:
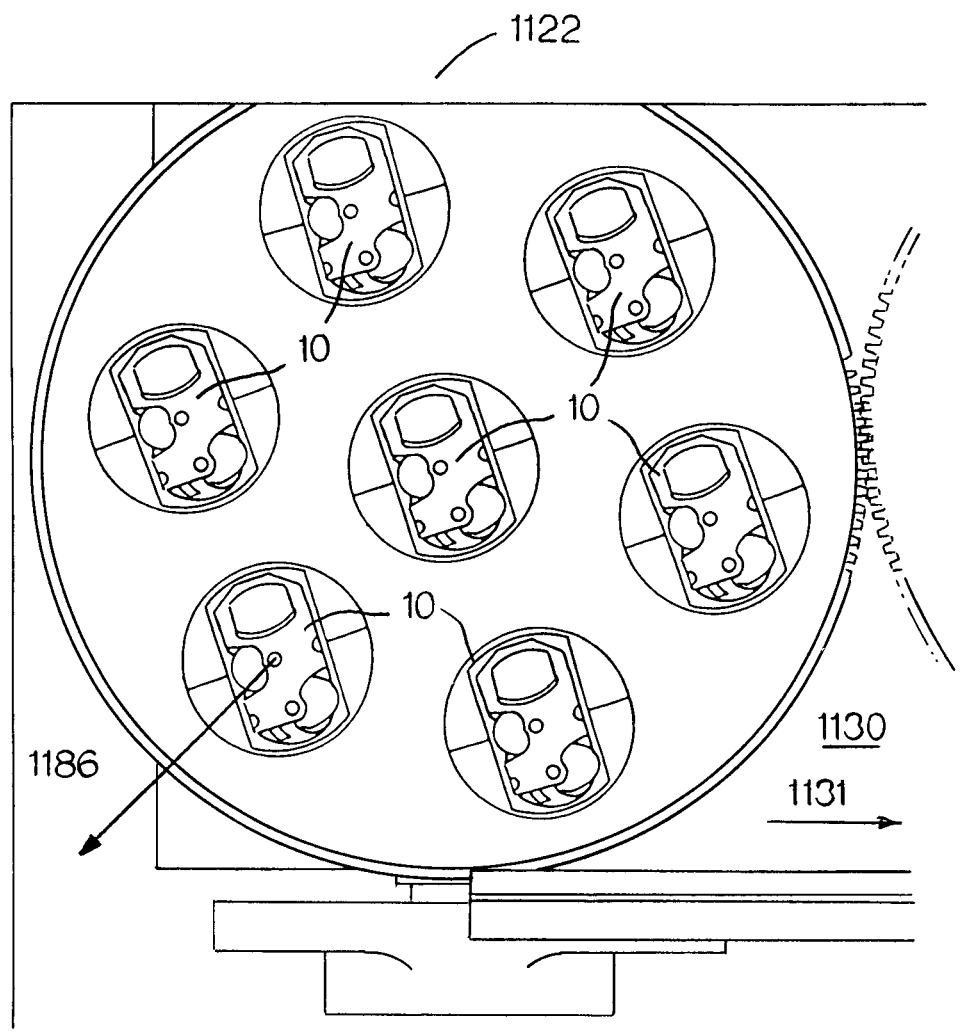
FIG. 31 is a detailed view of region 1122 of the conveyor system of FIG. 30A.

Another application involves use of a multi-directional roller assembly to align articles, as shown in FIGS. 30A, 30B, and 31. The alignment system 1100 includes an array of roller plates 1110, each housing an array of multi-directional roller assemblies 10, for translating or rotating and registering an article against a fixed object. The multi-directional roller assemblies 10 support an article of conveyance, illustrated as a package 1170, that travels through the system. The multi-directional roller assemblies are oriented at an oblique angle to the direction 1131 of a driving conveyor belt 1130, as shown in FIG. 31. The package 1170 being supported by the roller assemblies 10 will translate across the width of the system 1100 in the direction of arrows 1186 until contact with a fixed object, illustrated as a fixed rail 1150. The package 1170 will align to the fixed object 1150.

Figure 32A:
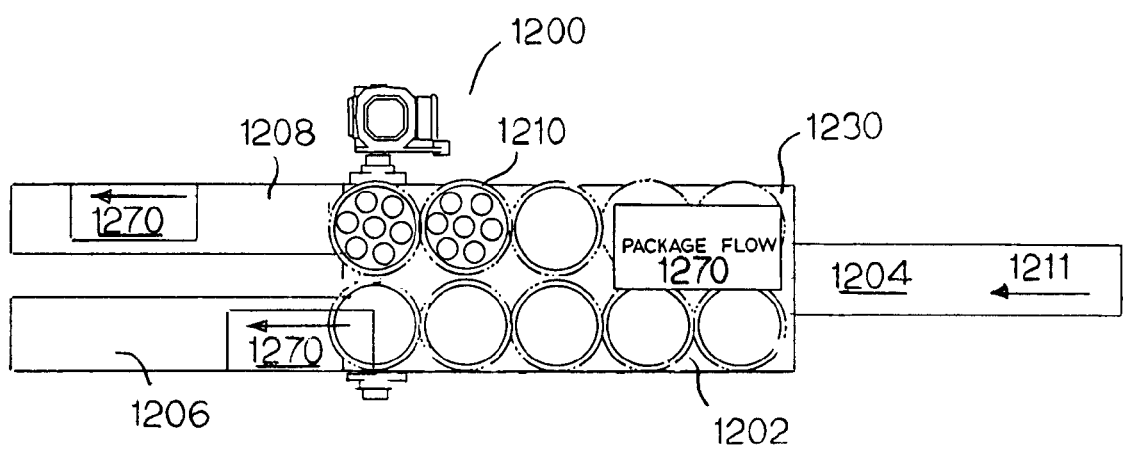
FIGS. 32A and 32B are top and side views of a conveyor system employing roller plates housing an array of multi-directional roller assemblies to divert articles of conveyance to one of two outfeed conveyors.
Figure 32B:
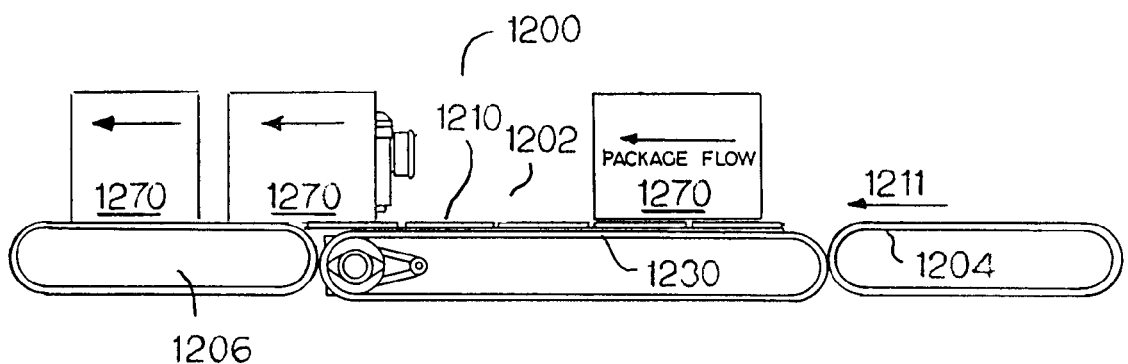

As shown in FIGS. 32A and 32B, arrays of multi-directional roller assemblies may be used in a switch 1202 for a conveying system 1200. The switch 1202 diverts articles 1270 from one or more infeed conveyors 1204, moving in the direction of arrow 1211 to two or more outfeed conveyors 1206, 1208. The multi-directional roller assemblies 10 are housed in roller plates 1210 arranged in an array, and a drive conveyor 1230 contacts the rollers in the roller plates to convey articles across the roller plates 1210. An actuator controls the orientation of each roller plate 1210 to control the trajectories of articles in the system and distribute the articles to either the first outfeed conveyor 1206 or the second outfeed conveyor 1208.

Figure 33:
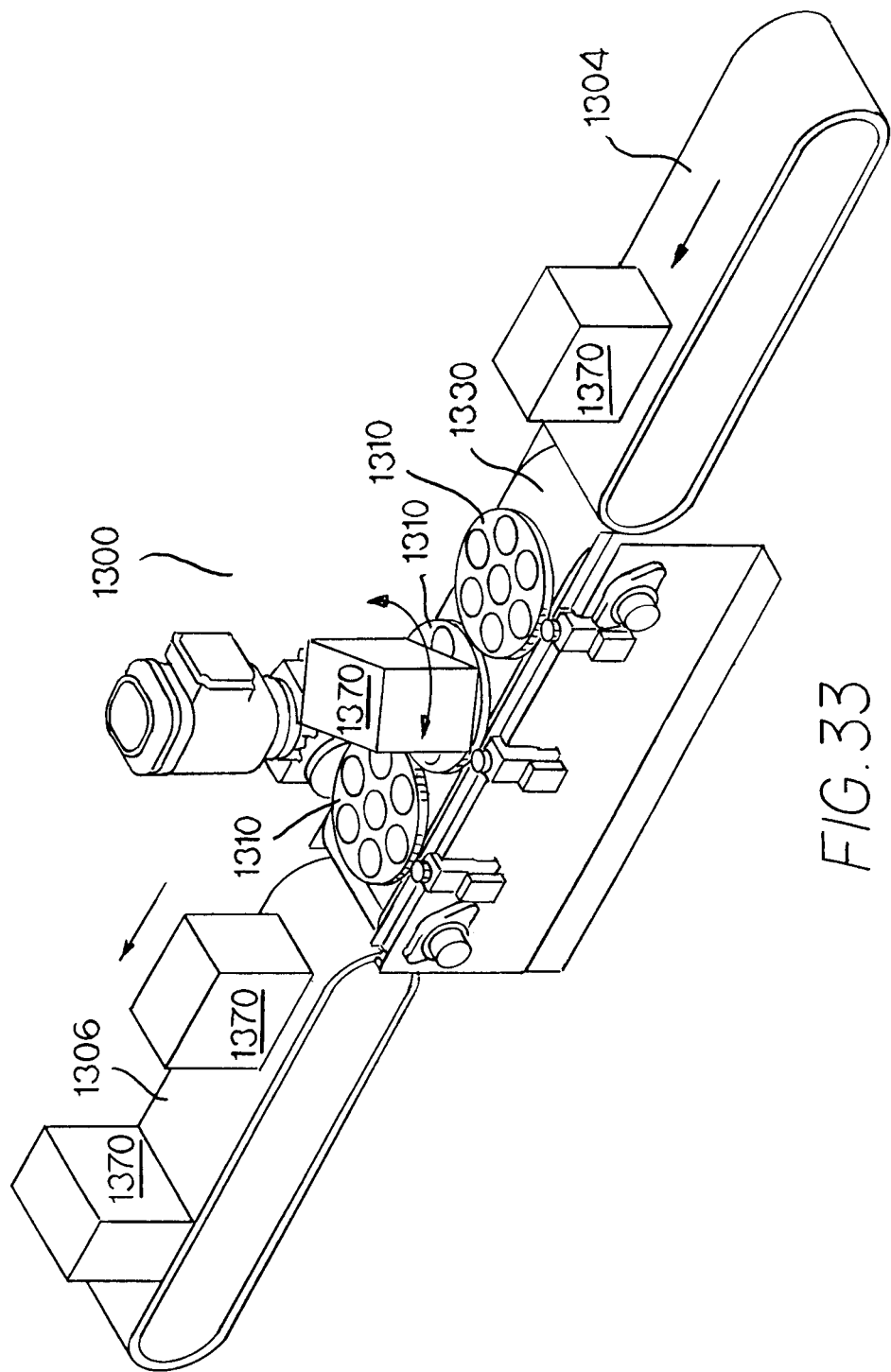
FIG. 33 illustrates a conveyor system employing roller plates housing an array of multi-directional roller assemblies to rotate an article of conveyance.

As shown in FIG. 33, arrays of multi-directional roller assemblies may be used to selectively rotate an article in a conveying system. An article rotator in a conveying system 1300 includes a plurality of article-supporting roller plates 1310, each including an array of multi-directional roller assemblies 10. An infeed conveyor 1304 conveys articles 1370 to the roller plates 1310, and an outfeed conveyor 1306 conveys rotated articles away from the roller plates 1310. A drive conveyor 1330 drives the rollers in the multi-directional roller assemblies to propel the articles through the system at a selected trajectory. When an article 1370 is located entirely on a single roller plate 1310, an actuator selectively rotates the entire roller plate to a desired angle, which rotates the article 1370 as well. The size of each roller plate 1310 depends on the size of the largest article to be rotated, as the roller plate should support the article to be rotated. The multi-directional roller assemblies may be rotated in opposite directions to maintain proper flow of articles through the conveying system.

Figure 34:
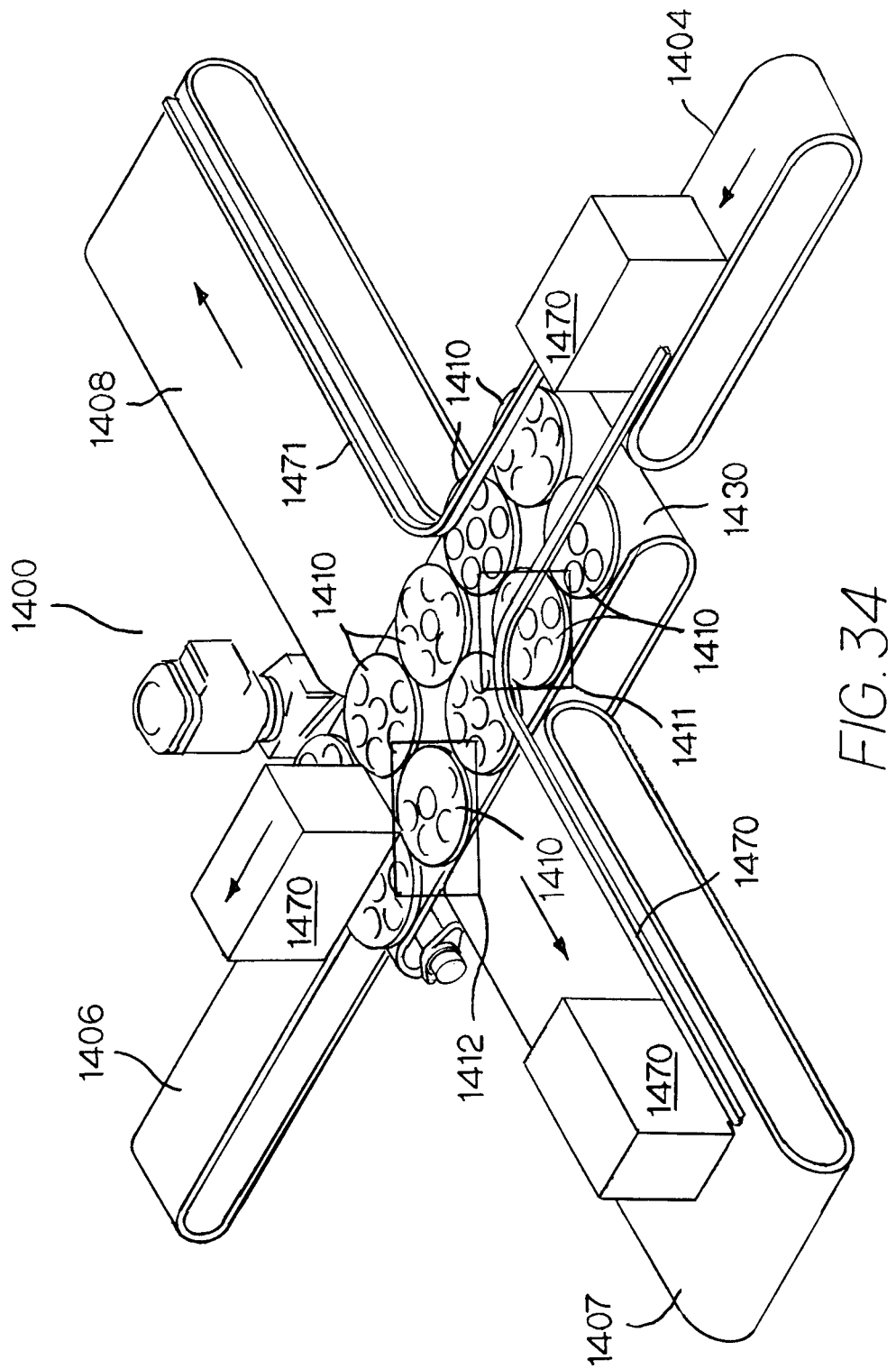
FIG. 34 illustrates a conveying system employing arrays of multi-directional roller assemblies for changing the direction of conveyance while maintaining the leading edge of a conveyed article.
Figure 35:
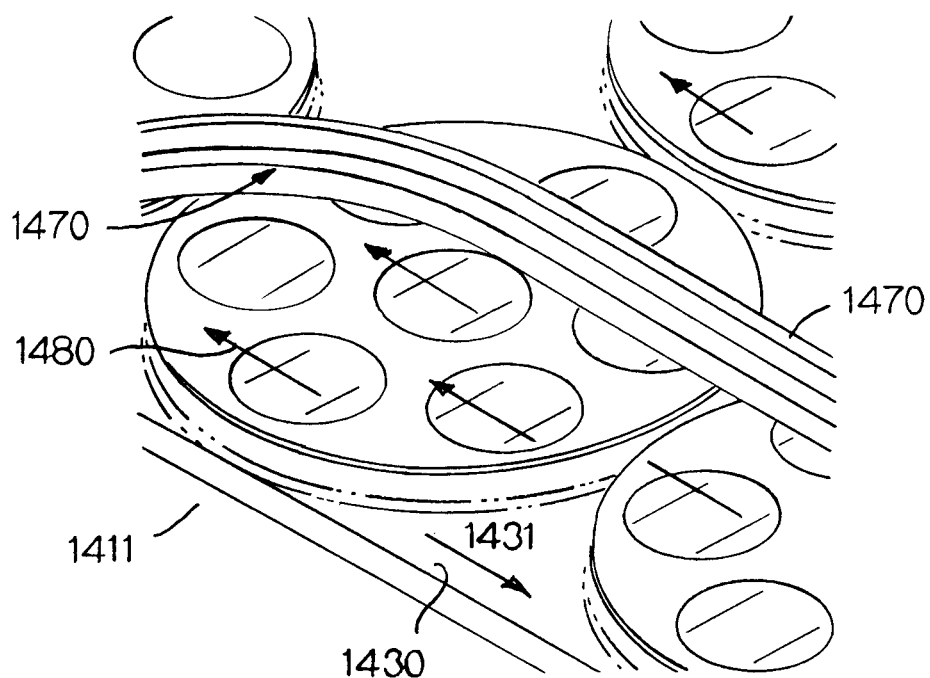
FIG. 35 is a detailed view of region 1411 of the conveyor system of FIG. 34.
Figure 36:
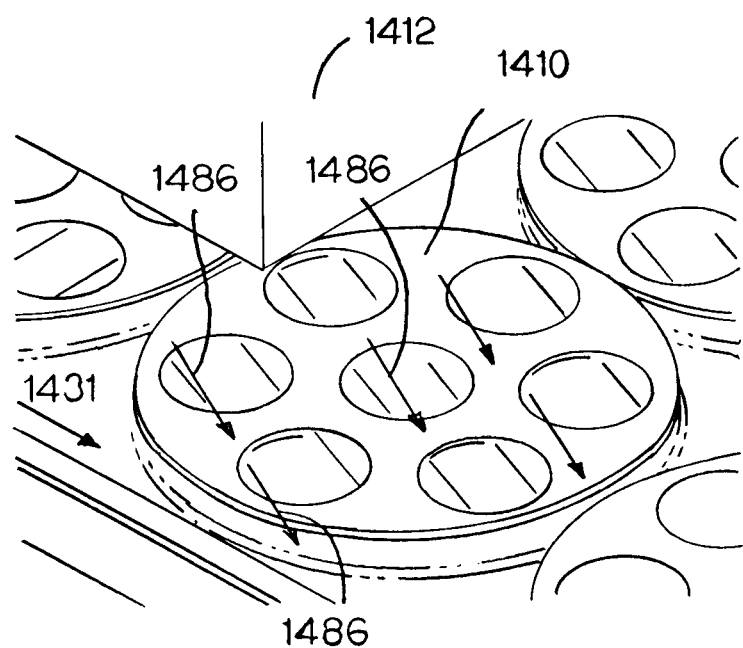
FIG. 36 is a detailed view of region 1412 of the conveyor system of FIG. 34.

FIG. 34 illustrates a conveying system 1400 employing arrays of multi-directional roller assemblies for changing the direction of conveyance while maintaining the leading edge of a conveyed article. The system 1400 includes an array of roller plates 1410, each comprising an array of article-supporting multi-directional roller assemblies 10. The system 1400 further includes an input conveyor 1404 and a plurality of output conveyors 1406, 1407, 1408 extending in different directions. A driving conveyor 1430 extends below the roller plates 1410 for driving the rollers in the multi-directional roller assemblies 10. At the downstream end 1411 of the array of roller plates 1410, the multi-directional roller assemblies are oriented to propel an article 1470 in contact with the assemblies forward, as shown in FIG. 35. At the downstream end, the multi-directional roller assemblies 10 are oriented with the main axes 14 perpendicular to the direction of travel 1431 of the drive conveyor 1430 so that the direction of travel 1480 of articles contacting the downstream assemblies 10 is opposite and parallel to the direction of travel 1431 of the drive conveyor 1430, thereby pushing the articles 1470 forward. At the upstream end 1412, the multi-directional roller assemblies are selectively oriented to direct an article in the direction of arrows 1486 onto one of the three output conveyors 1406, 1407, 1408, as shown in FIG. 36. Depending on their orientation, which may be controlled through any suitable means as previously described, the multi-directional roller assemblies 10 in the upstream end 1412, direct an article forward onto the first output conveyor 1406, to the side and back against a fixed side guard 1470 to direct the article down the second output conveyor 1407 or to the other side and back against another fixed side guard 1471 to direct the article down the third output conveyor 1408.

A multi-directional roller assembly or an array of multi-directional roller assemblies may be used in any suitable system and any suitable means may be used to control the orientation of the multi-directional roller assemblies in order to control the trajectory of an article.

As these few examples suggest, the scope of the invention is meant to be defined by the claims and not limited to the details of the described versions.

What is claimed is:

1. A multi-directional roller assembly, comprising:
    a frame rotatable about a main axis; and
    at least one set of two parallel, mutually-actuating rollers mounted to the frame, each roller rotatable about a minor axis in an opposite direction from the other roller in the set, wherein each minor axis is transverse to the main axis.

2. The multi-directional roller assembly of claim 1, wherein the parallel, mutually-actuating rollers in each set have outer surfaces in contact with each other, such that rotation of a first roller in a first direction about a first minor axis induces rotation of the other roller in a second direction about a second minor axis.

3. The multi-directional roller assembly of claim 1, wherein the mutually-actuating rollers actuate each other through magnetic actuation or gears.

4. The multi-directional roller assembly of claim 1, wherein the frame is substantially cylindrical.

5. The multi-directional roller assembly of claim 1, wherein the at least one set of mutually-actuating rollers comprises two sets of mutually-actuating rollers, each set comprising a pair of parallel rollers.

6. The multi-directional roller assembly of claim 1, wherein the at least one set of mutually-actuating rollers comprises three sets of mutually-actuating rollers arranged about the periphery of the frame, each set comprising a pair of parallel rollers.

7. The multi-directional roller assembly of claim 1, further comprising a roller housing for rotatably mounting the frame.

8. The multi-directional roller assembly of claim 7, wherein the roller housing is disk-shaped and includes openings in a periphery for receiving axle nubs of the frame, wherein the openings extend along the main axis.

9. The multi-directional roller assembly of claim 8, wherein the roller housing includes an offset cam ring.

10. The multi-directional roller assembly of claim 7, wherein the roller housing includes gear teeth about a perimeter thereof.

11. The multi-directional roller assembly of claim 1, wherein at least a portion of the rollers extends radially outward of the frame.

12. The multi-directional roller assembly of claim 1, wherein an object supported by the frame and rollers will be directed off the assembly at an output angle relative to an input force that is twice an input angle between the main axis and the input force.

13. A roller plate, comprising:
an upper plate having an array of upper openings;
a lower plate having an array of lower openings matching the array of upper openings; and
an array of multi-directional roller assemblies housed in the upper and lower openings, each multi-directional roller assembly comprising a frame rotatable about a main axis and at least one set of two parallel rollers mounted to the frame, each roller in each set rotatable about a minor axis that is transverse to the main axis, wherein each roller is rotatable in an opposite direction from the other roller in the set.

14. The roller plate of claim 13, wherein the rollers in each set are mutually-actuating.

15. The roller plate of claim 13, further comprising an actuator for orienting at least one of the multi-directional roller assemblies relative to the upper plate and lower plate.

16. The roller plate of claim 13, wherein each multi-directional roller assembly further includes a disk-shaped roller housing for rotatably mounting the frame.

17. The roller plate of claim 16, wherein each roller housing includes gear teeth about a perimeter thereof.

18. The roller plate of claim 17, further comprising a gear rack for engaging the gear teeth to selectively rotate each multi-directional roller assembly relative to the upper plate and lower plate.

19. The roller plate of claim 17, further comprising a plurality of spur gears disposed between the multi-directional roller assemblies for engaging the gear teeth to selectively rotate each multi-directional roller assembly relative to the upper plate and lower plate.

20. The roller plate of claim 16, further comprising a cam plate between the upper plate and lower plate and an offset cam ring on the roller housing.

21. The roller plate of claim 13, further comprising gear teeth on a periphery of one of the upper plate and the lower plate.

22. A conveyor system, comprising:
an array of multi-directional roller assemblies, each multi-directional roller assembly comprising a frame rotatable about a main axis and at least one pair of parallel, mutually-actuating rollers mounted to the frame, each roller rotatable about a minor axis in an opposite direction from an associated roller in the pair, wherein the minor axis is transverse to the main axis; and
a driver for inducing rotation of at least one of the frame and the rollers.

23. The conveyor system of claim 22, wherein the driver comprises a conveyor belt in contact with at least one of the rollers, whereby movement of the conveyor belt induces rotation of at least one of the frame and the at least one pair of rollers.

24. The conveyor system of claim 22, further comprising an actuator for selectively orienting the multi-directional roller assemblies to change an output trajectory of an article disposed on the array of multi-directional roller assemblies.

25. The conveyor system of claim 22, further comprising a fixed rail adjacent to the array of multi-directional roller assemblies for directing an article of conveyance.

26. A method of directing an article of conveyance using a multi-directional roller assembly, comprising:
placing an article in contact with the multi-directional roller assembly, the multi-directional roller assembly including a frame rotatable about a main axis and at least one roller rotatable about a minor axis that is transverse to the main axis; and
applying an input force to the multi-directional roller assembly at an input angle relative to the major axis, causing rotation of at least one of the frame and the roller, such that the article is pushed from the multi-directional roller assembly at an output angle that is at least twice the input angle.

27. The method of claim 26, further comprising the step of changing an orientation of the multi-directional roller assembly to change an output trajectory of the article.

28. The method of claim 26, wherein the step of applying an input force comprises contacting the multi-directional roller assembly with a moving conveyor belt.

29. A multi-directional roller assembly, comprising:
a frame rotatable about a main axis; and
at least one set of mutually-actuating rollers mounted to the frame, each roller rotatable about a minor axis that is transverse to the main axis, wherein an object supported by the frame and rollers will be directed off the assembly at an output angle relative to an input force that is twice an input angle between the main axis and the input force.

30. The multi-directional roller assembly of claim 29, further comprising a roller housing for rotatably mounting the frame.

31. A multi-directional roller assembly, comprising:
a frame rotatable about a main axis, the frame including axle nubs;
at least one set of two parallel, mutually-actuating rollers mounted to the frame, each roller rotatable about a minor axis that is transverse to the main axis; and
a disk-shaped roller housing for rotatably mounting the frame, the roller housing including peripheral openings extending along the main axis for receiving the axle nubs.

32. A multi-directional roller assembly, comprising:
a frame rotatable about a main axis; and
a first pair of parallel, mutually-actuating rollers mounted to the frame, the parallel, mutually actuating rollers having outer surfaces in contact with each other, such that rotation of a first roller in a first direction about a first minor axis induces rotation of a second, parallel roller in a second direction about a second minor axis,
wherein the first minor axis and second minor axis are transverse to the main axis.

33. The multi-directional roller assembly of claim 32, further comprising a second pair of parallel, mutually-actuating rollers mounted to the frame, wherein the second pair of parallel, mutually-actuating rollers is spaced from the first pair of parallel, mutually-actuating rollers along the length of the frame.

34. The multi-directional roller assembly of claim 32, further comprising a second pair of parallel, mutually-actuating rollers mounted to the frame, wherein the second pair of parallel, mutually-actuating rollers is offset radially from the first pair of parallel, mutually-actuating rollers.

* * * * *